(12) United States Patent
Hosaka et al.

(10) Patent No.: US 7,162,547 B2
(45) Date of Patent: Jan. 9, 2007

(54) CARD CONNECTION ADAPTOR

(75) Inventors: Taiji Hosaka, Kanagawa (JP); Kaori Yasufuku, Kanagawa (JP)

(73) Assignee: J.S.T. Mfg., Co., Ltd., Osaka (JP)

( * ) Notice: Subject to any disclaimer, the term of this patent is extended or adjusted under 35 U.S.C. 154(b) by 715 days.

(21) Appl. No.: 09/970,184

(22) Filed: Oct. 4, 2001

(65) Prior Publication Data

US 2002/0032813 A1 Mar. 14, 2002

Related U.S. Application Data

(62) Division of application No. 09/264,564, filed on Mar. 8, 1999, now Pat. No. 6,408,352.

(30) Foreign Application Priority Data

Jan. 21, 1999 (JP) .................................. 11-13333

(51) Int. Cl.
*G06F 3/00* (2006.01)
*G06F 13/12* (2006.01)
*G06F 3/01* (2006.01)

(52) U.S. Cl. .................... 710/8; 710/8; 710/62; 710/64

(58) Field of Classification Search .................... 710/8, 710/20, 36, 37, 62, 64
See application file for complete search history.

(56) References Cited

U.S. PATENT DOCUMENTS

| 5,155,663 A | | 10/1992 | Harase ........................ 361/395 |
| 5,184,282 A | * | 2/1993 | Kaneda et al. ............... 361/737 |
| 5,584,043 A | | 12/1996 | Burkart |
| 5,664,229 A | * | 9/1997 | Bhargava et al. ............. 710/65 |
| 5,727,184 A | * | 3/1998 | Richter et al. ................. 710/62 |
| 5,737,582 A | | 4/1998 | Fukuzumi ................... 395/500 |
| 5,752,857 A | | 5/1998 | Knights |
| 5,820,414 A | | 10/1998 | Omori |
| 5,828,905 A | * | 10/1998 | Rao ............................. 710/63 |
| 5,907,197 A | | 5/1999 | Faulk |
| 5,961,352 A | * | 10/1999 | Denny et al. ................ 439/637 |
| 5,991,158 A | | 11/1999 | Chan et al. |
| 5,991,530 A | * | 11/1999 | Okada et al. .................. 703/25 |
| 6,036,088 A | * | 3/2000 | Itoh et al. .................... 235/375 |
| 6,224,391 B1 | | 5/2001 | Horie et al. |
| 6,257,906 B1 | | 7/2001 | Price et al. |

(Continued)

FOREIGN PATENT DOCUMENTS

EP 05067114 3/1993

(Continued)

*Primary Examiner*—Kim Huynh
*Assistant Examiner*—Scott Sun
(74) *Attorney, Agent, or Firm*—Rader, Fishman & Grauer PLLC

(57) ABSTRACT

A card connection adaptor is provided which is used for connecting, to a connector of a card slot compliant with a first standard, a card compliant with a second standard. The adaptor includes: a first connector compliant with the first standard and adapted to be electrically connected to the connector of the card slot; a second connector compliant with the second standard; and signal conversion circuitry for performing signal conversion between a first-standard-compliant signal and a second-standard-compliant signal. A card retaining space for retaining the second-standard-compliant card inserted therein is formed in a housing which holds the first connector, the second connector and the signal conversion circuit. The card retaining space has a card insertion port which opens generally perpendicularly to an insertion direction in which the card connection adaptor is inserted into the card slot.

15 Claims, 26 Drawing Sheets

U.S. PATENT DOCUMENTS 6,264,506 B1 * 7/2001 Yasufuku et al. ............ 439/638
6,286,066 B1 9/2001 Hayes et al.

FOREIGN PATENT DOCUMENTS

| | | |
|---|---|---|
| EP | 07141114 | 6/1995 |
| EP | 07239923 | 9/1995 |
| EP | 0724226 A2 | 7/1996 |
| JP | 03-023480 | 3/1991 |
| JP | 05067114 | 3/1993 |
| JP | 6-509194 | 10/1994 |
| JP | 6-318390 | 11/1994 |
| JP | 7-36586 | 2/1995 |
| JP | 7-141114 | 6/1995 |
| JP | 8-55661 | 2/1996 |
| JP | 8-90969 | 4/1996 |
| JP | 8-180148 | 7/1996 |
| JP | 8-227445 | 9/1996 |
| JP | 9-171863 | 6/1997 |
| JP | 10-83434 | 3/1998 |
| JP | 10-177627 | 6/1998 |

* cited by examiner

F I G. 7
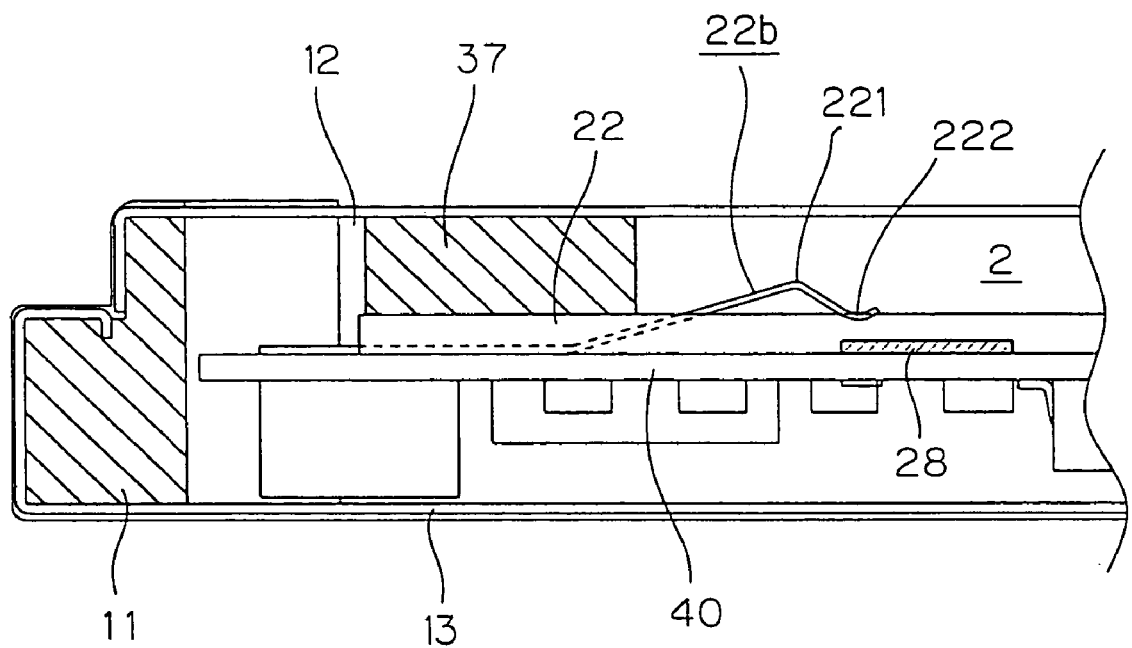

F I G. 16
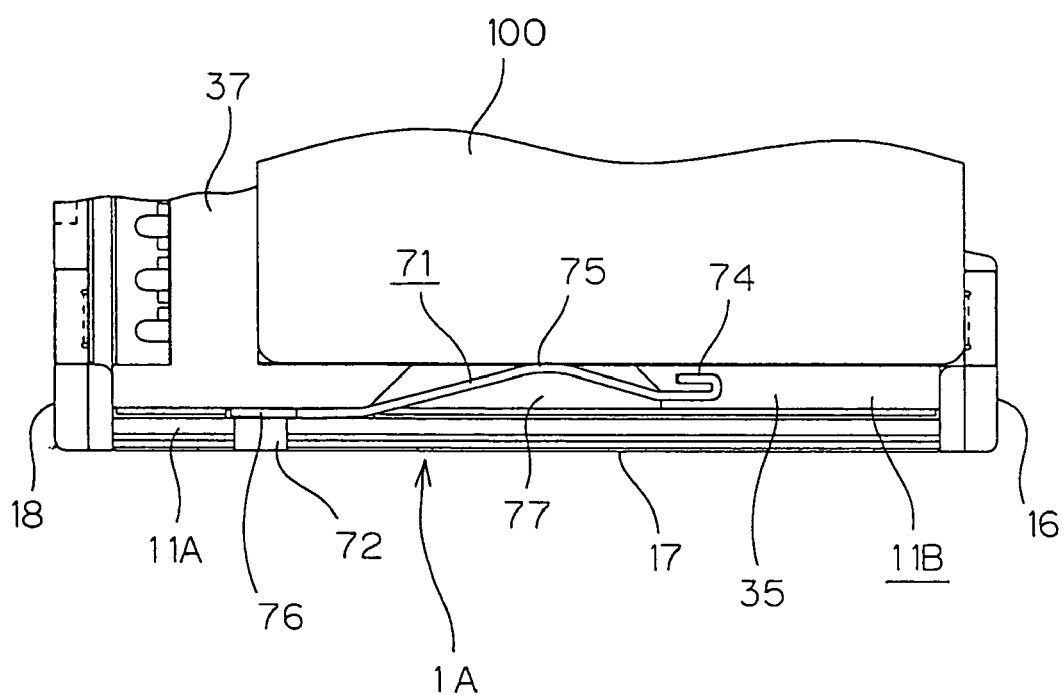

F I G. 22
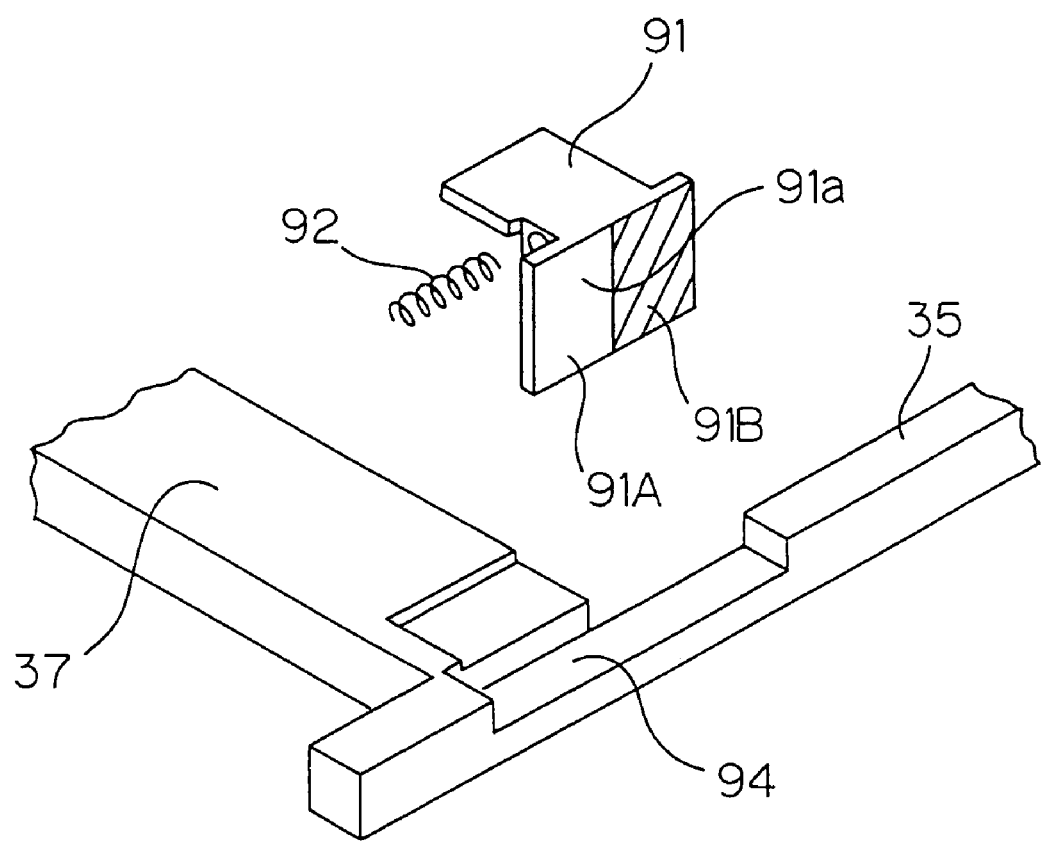

F I G. 24
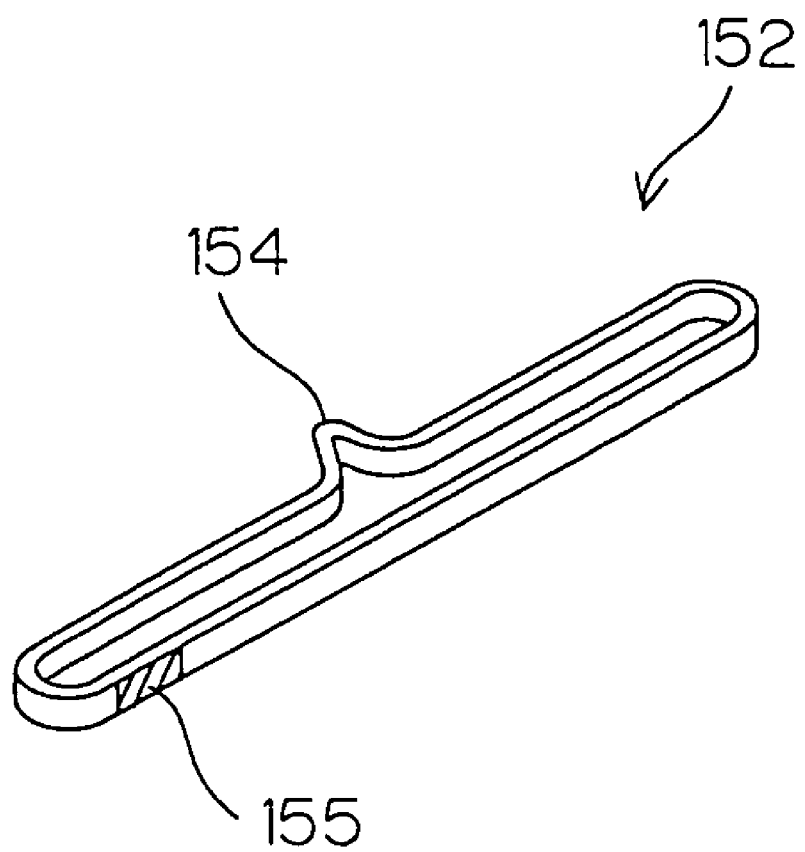

F I G. 26A
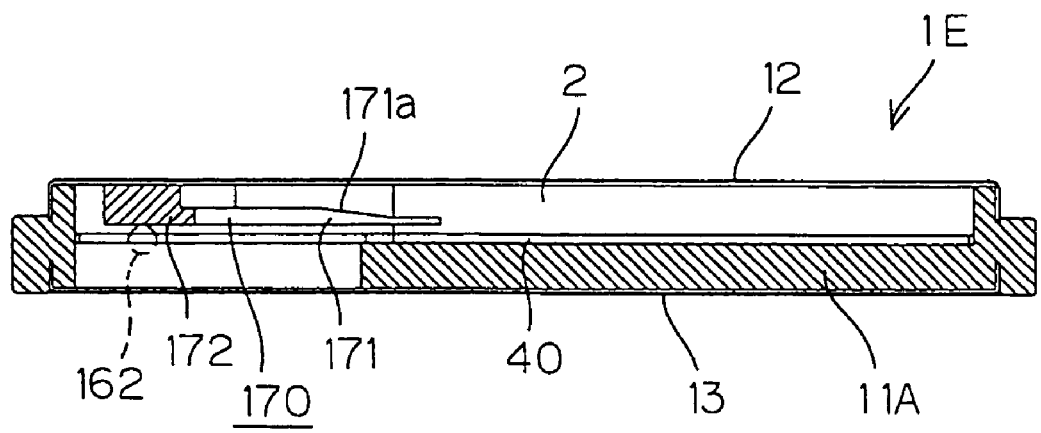
F I G. 26B
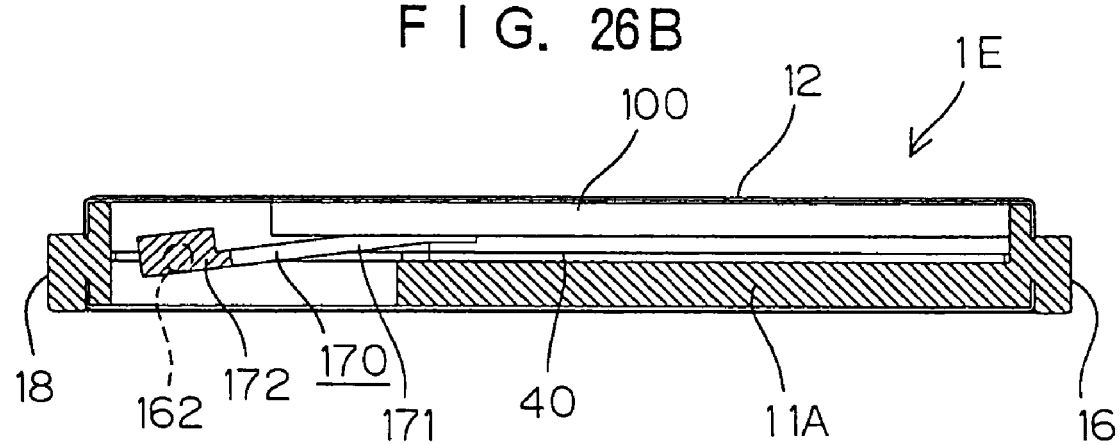

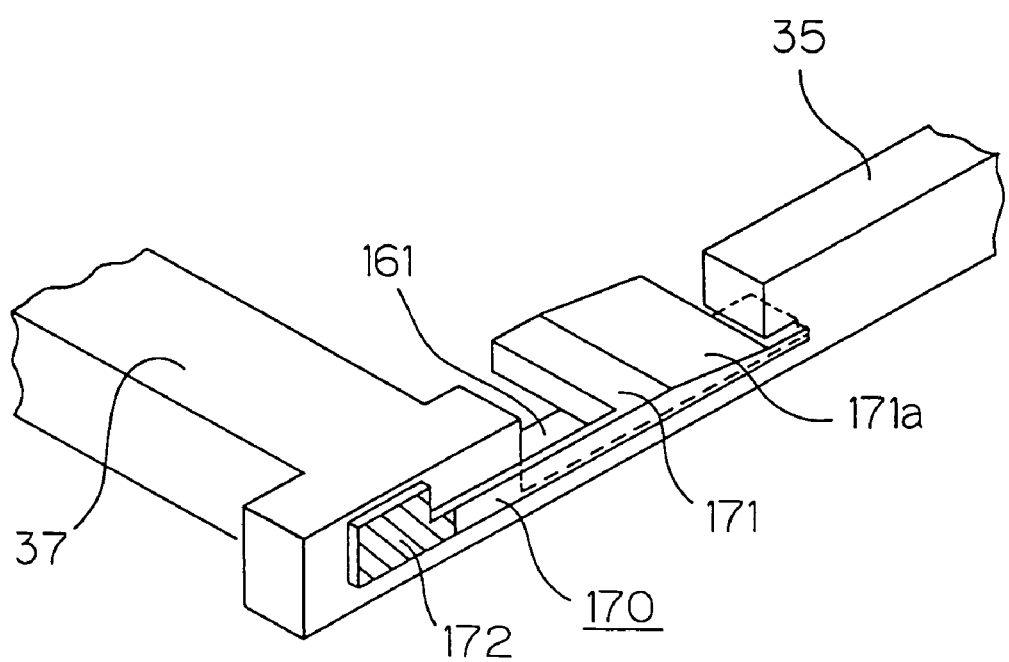
F I G. 27

F I G. 30
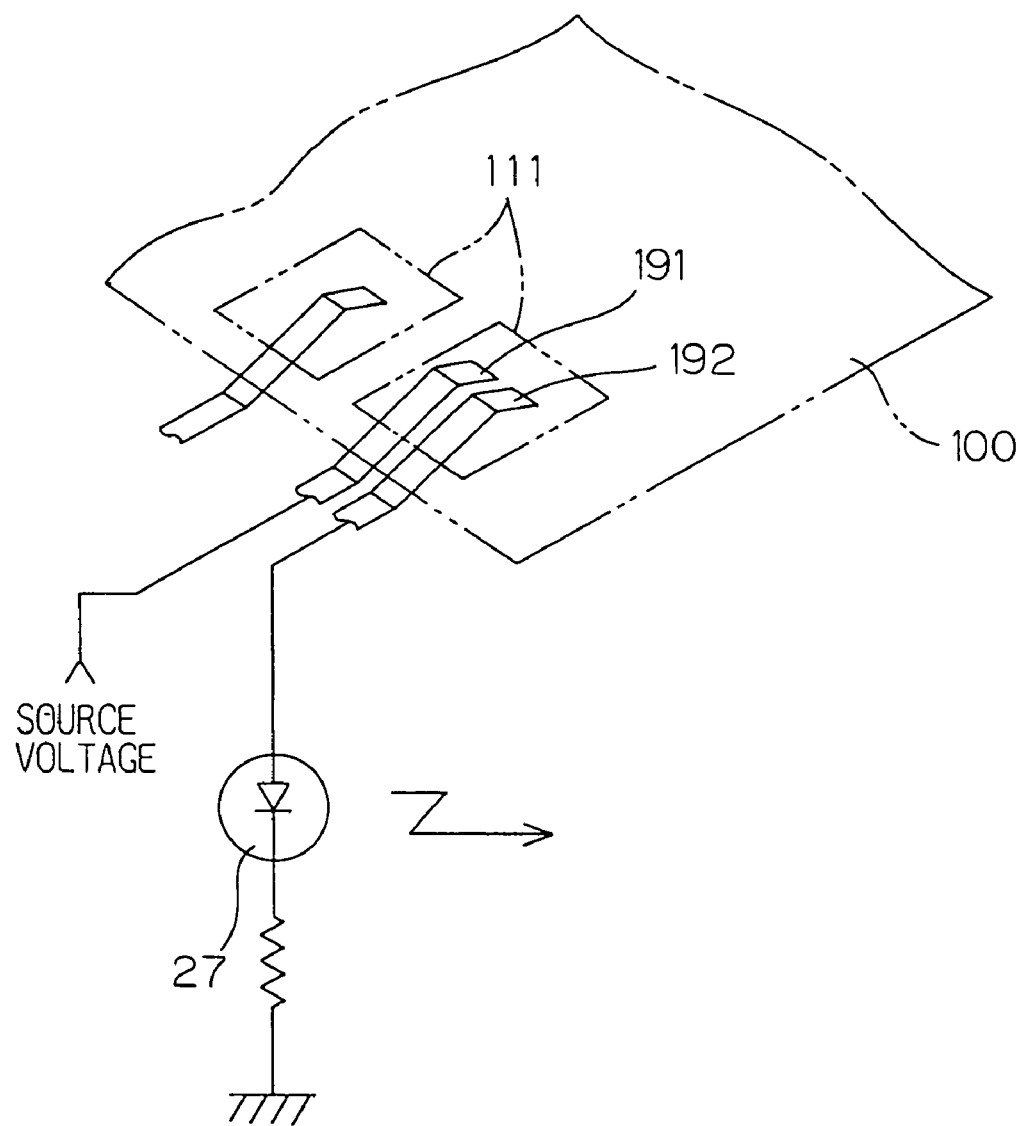

CARD CONNECTION ADAPTOR

This application is a division of Ser. No. 09/264,564 filed Mar. 8, 1999, now U.S. Pat. No. 6,408,352.

BACKGROUND OF THE INVENTION

1. Field of the Invention

The present invention relates to a card connection adaptor for connecting an IC card such as a memory card or a functional extension card to an information system such as a personal computer, or a portable information system represented by a PDA (personal digital assistant), a digital still camera and a digital video camera.

2. Description of Related Art

Recent notebook PCs (personal computers) are generally equipped with PC card slots. Functional extension of such a notebook PC can be achieved by inserting a PC card into the PC card slot. Exemplary PC cards include flash memory cards, modem cards and SCSI cards.

The PC cards are designed in compliance with the PC Card Standard, and classified into three types which have thicknesses of 3.3 mm (Type I), 5.0 mm (Type II) and 10.5 mm (Type III), respectively, with a rectangular plan shape of 54.0-mm width and 85.6-mm length.

For smaller-size information systems such as digital cameras, electronic organizers and portable phones, smaller-size CF (CompactFlash (registered trade mark)) cards are employed instead of the PC cards to meet a heavy demand for size reduction. Typical examples of the CF cards are flash memory cards which are employed to store image data picked up by digital cameras and schedule data and address data for electronic organizers.

The CF cards are designed in compliance with the CFA (CompactFlash Association) Standard and classified into two types which have thicknesses of 3.3 mm (Type I) and 5.0 mm (Type II), respectively, with a rectangular plan shape of 36.4-mm width and 42.5-mm length.

Further, the digital cameras, digital voice recorders and portable phones employ small-size memory cards adapted only for memory functions. Such a small-size memory card includes a memory IC die packaged by resin-sealing, and is characterized by its extremely small thickness. Examples of the memory cards include SmartMedia cards (SSFDCs: solid state floppy disk cards), Miniature cards, MemoryStick cards and MultiMedia cards.

These cards have outer dimensions as shown below:

| | |
|---|---|
| SmartMedia (SM): | 37 × 45 × 0.76 (mm) |
| Miniature card (MC): | 38 × 33 × 3.5 (mm) |
| MemoryStick (MS): | 50 × 21.5 × 2.8 (mm) |
| MultiMedia card (MMC): | 32 × 24 × 1.4 (mm) |

Since the smaller-size information systems do not always have sufficient data processing power, it is often necessary to load image data picked up by a digital camera into a notebook PC or to transfer data between an electronic organizer and a notebook PC.

However, when data retained in the small-size information system are to be loaded into the notebook PC via a CF card or a small-size memory card, for example, such a card cannot directly be fitted in the PC card slot of the notebook PC because the PC card slot is designed in compliance with the PC Card Standard.

Therefore, card connection adaptors are conventionally provided for connecting a CF card or a small-size memory card to a PC card slot.

Such a card connection adaptor includes a housing having a shape conformal to the PC card, a first connector provided on a front side of the housing for connection to a PC card slot, and a second connector provided within the housing for connection to a CF card or a small-size memory card. A card retaining space for receiving the CF card or the small-size memory card is provided within the housing. The card retaining space opens into a rear face of the housing as seen in an insertion direction in which the card connection adaptor is inserted into the PC card slot. Where the small-size card has a thickness close to the thickness of the card connection adaptor, the card retaining space may also open into the upper and/or lower side of the housing. In any case, the small-size card is inserted into the card connection adaptor from the rear side of the card connection adaptor in the same direction as the insertion direction in which the card connection adaptor is inserted into the PC card slot.

However, this arrangement has drawbacks from mechanical and electrical viewpoints. More specifically, when the card connection adaptor is fitted in the PC card slot, a rear portion of the small-size card fitted in the card connection adaptor is exposed from an opening of the PC card slot. Hence, there is a possibility that the small-size card is disconnected from the card connection adaptor by some external force. If the small-size card is disconnected during data transfer between an information system and the small-size card, the data transfer is of course failed, and destruction of date or destruction of elements inside the small-size card may result from erroneous signal input. This is particularly problematic in the case of a card which is designed to lead signal input/output interconnections from the small-size card (e.g., GSM card). Further, it is difficult to provide a lock holder in the card connection adaptor for assuredly holding the small-size card, whereas it is easy to provide a holder mechanism in a PC card slot for holding a card inserted therein.

Since it is physically possible to insert the small-size card into the card connection adaptor from the rear side thereof with the card connection adaptor fitted in a PC card slot, a user may make an attempt to insert the small-size card into the card connection adaptor in this sate. In such a case, a great external force is exerted onto the connector of the PC card slot, so that the connector may be damaged.

In addition, there is a possibility that the small-size card is inserted into or withdrawn from the card connection adaptor fitted in a PC card slot when the information system is energized. Therefore, in designing the card connection adaptor, a consideration should be given to prevent the small-size card from being damaged by so-called active card insertion and withdrawal. More specifically, connection terminals of the card connection adaptor should accurately be positioned so that the connection/disconnection orders and connection/disconnection timings for connection and disconnection of connection terminals of the small-size card with respect to the connection terminals of the card connection adaptor can be kept substantially constant when the small-size card is inserted into or withdrawn from the card connection adaptor. When the small-size card is to be inserted into the card connection adaptor, for example, connection of a grounding terminal, a source terminal, a first signal terminal, a second terminal and so forth should be established in the order named within an allowable connection timing range. It is, therefore, extremely difficult to design the card connection adaptor which can offer a guarantee against the active insertion and withdrawal.

SUMMARY OF THE INVENTION

It is a first object of the present invention to provide a card connection adaptor which is capable of preventing disconnection of a small-size card therefrom when the adaptor is fitted in a card slot, thereby having an improved reliability.

It is a second object of the present invention to provide a card connection adaptor which is capable of prohibiting a small-size card from being inserted thereinto or withdrawn therefrom when the adaptor is fitted in a card slot, thereby having an improved reliability and a simplified construction.

It is a third object of the present invention to provide a card connection adaptor which is constructed so as to be able to give an indication of the presence or absence of a small-size card in the adaptor when the adaptor is fitted in a card slot.

In accordance with one aspect of the present invention, there is provided a card connection adaptor for connecting to a connector of a card slot compliant with a predetermined first standard, a card compliant with a second standard which is different from the first standard, the card connection adaptor comprising: a first connector compliant with the first standard and adapted to be electrically connected to the connector of the card slot; a second connector compliant with the second standard; signal conversion circuitry connected to the first connector and the second connector for performing signal conversion between a first-standard-compliant signal and a second-standard-compliant signal; and a housing which holds the first connector, the second connector and the signal conversion circuitry, the housing having a card insertion port which opens in a direction generally perpendicular to an adaptor insertion direction in which the card connection adaptor is inserted into the card slot, and a card retaining space for retaining therein the second-standard-compliant card inserted from the card insertion port.

The card connection adaptor preferably has a card shape conformal to the first-standard-compliant card slot. That is, the housing preferably has a card-like exterior configuration which is conformal to a first-standard-compliant card. In this case, "the direction generally perpendicular to the adaptor insertion direction" is preferably a direction parallel to upper and lower faces of the card-shaped adaptor.

The first connector is preferably provided on a face of the adaptor to be opposed to the connector of the card slot.

The second connector is preferably provided in such a position that the second connector can be brought into contact with terminals of the second-standard-compliant card retained in the card retaining space.

It is preferred that the card retaining space does not open into a rear face of the adaptor as seen in the adaptor insertion direction. That is, at least the rear side of the card retaining space is preferably closed so that the second-standard-compliant card cannot be inserted or withdrawn from the rear side.

The connector of the card slot is preferably adapted to be contact-connected to the first connector.

The card connection adaptor may be powered via the connector of the card slot and the first connector. In this case, the second-standard-compliant card may be powered from the card connection adaptor.

The card slot may be a PC-standard memory card slot. In this case, the PC-standard memory card slot means a card slot which may commonly be provided in a PC. Examples of such a card slot include those which are compliant with the PC Card Standard and the CF Card Standard. These standards stipulate that an input/output control circuit for controlling data input and output be provided in the card. Examples of such an input/output control circuit include those which are adapted to control writing and reading of data with respect to a memory IC incorporated in the card.

The card retaining space is preferably configured so as not to allow the second-standard-compliant card to project outwardly of the card retaining space when the card is retained in the card retaining space.

The card connection adaptor may further include a wiring board provided within the housing, wherein the first connector, the second connector and the signal conversion circuitry are mounted on the wiring board.

The housing may include a resin frame and a metal cover which covers the resin frame.

The signal conversion circuitry may include a pin configuration conversion circuit for converting a pin configuration between a first-standard-compliant card and the second-standard-compliant card.

The signal conversion circuitry may include a signal processing circuit for converting signal format between the first-standard-compliant signal and the second-standard-compliant signal to ensure inter-standard compatibility.

The second-standard-compliant card may be a memory card which incorporates therein a memory IC and has a data storage function.

In accordance with the arrangement of the present invention, the housing of the card connection adaptor is formed with the card retaining space having the card insertion port which opens generally perpendicularly to the adaptor insertion direction in which the card connection adaptor is inserted into the first-standard-compliant card slot, and the second-standard-compliant card is inserted into the card connection adaptor from the card insertion port. That is, a card insertion direction in which the second-standard-compliant card is inserted into the card connection adaptor is generally perpendicular to the adaptor insertion direction.

This arrangement prevents the second-standard-compliant card from being inserted into or withdrawn from the adaptor in the adaptor insertion direction. This eliminates the possibility that the second-standard-compliant card is disconnected from the card connection adaptor, and prevents the insertion and withdrawal of the second-standard-compliant card with respect to the card connection adaptor, when the card connection adaptor is fitted in the card slot. Accordingly, an excessively large external force is not exerted on the connector of the card slot. Further, since the active insertion and withdrawal of the second-standard-compliant card with respect to the card connection adaptor can be prohibited, there is no need to provide the guarantee against the active insertion and withdrawal. This ensures easier designing of the card connection adaptor.

The first standard may be a standard which stipulates that an input/output control circuit be provided in a card to be inserted into the card slot.

With this arrangement, the first standard stipulates that the input/output control circuit be present in the card and, therefore, either the card connection adaptor or the second-standard-compliant card should have the input/output control circuit. Where the card connection adaptor has the input/output control circuit, the signal conversion circuitry preferably includes the input/output control circuit.

Examples of cards designed in compliance with standards which stipulate that the input/output control circuit be present in a card include PC cards, CF cards, small PC cards (SPC with exterior dimensions of 42.8×45×5.0 (mm)).

The signal conversion circuitry may include an input/output control circuit for performing an input/output control with respect to the second-standard-compliant card.

With this arrangement, the input/output control circuit is provided in the card connection adaptor and, therefore, the second standard may be a standard which stipulates that the input/output control circuit be present in the card slot, or a standard which stipulates that the input/output control circuit be present in the card. Examples of cards designed in compliance with standards which stipulate that the input/output control circuit be present in a card slot include SmartMedia cards, MultiMedia cards, Miniature cards, MemoryStick cards and SIM (subscriber identity module) cards.

The second standard may be a standard which stipulates that an input/output control circuit be provided in the second-standard-compliant card.

With this arrangement, the card connection adaptor need not have a data input/output control function. Therefore, the signal conversion circuitry may merely include the pin configuration conversion circuit.

Examples of cards designed in compliance with standards which stipulate that the input/output control circuit be provided in a card include PC cards, Small PC cards and CF cards.

In accordance with another aspect of the present invention, there is provided a card connection adaptor which comprises: a first connector compliant with the first standard; a second connector compliant with the second standard; a housing which holds the first connector and the second connector, the housing having a card insertion port which opens in a direction generally perpendicular to an adaptor insertion direction in which the card connection adaptor is inserted into a card slot, and a card retaining space for retaining therein the second-standard-compliant card inserted from the card insertion port; and an indication mechanism for providing an indication of whether or not the second-standard-compliant card is retained in the housing on a rear face of the adaptor as seen in the adaptor insertion direction (on a face of the adaptor to be located adjacent an opening of the card slot when the card connection adaptor is fitted in the card slot).

Since the card is inserted into the card retaining space of the housing in a card insertion direction which is perpendicular to the adaptor insertion direction, the housing need not have an opening on the rear face thereof. For enhancement of the strength of the housing and prevention of intrusion of foreign matters in the card retaining space, it is preferred that the rear face of the housing is closed.

With such an arrangement, however, it is impossible to check whether or not the second-standard-compliant card is fitted in the adaptor by viewing the opening of the card slot when the card connection adaptor is fitted in the card slot.

In accordance with the invention, the indication mechanism for indicating whether or not the second-standard-compliant card is retained in the card retaining space is provided on the rear face of the housing. Thus, the presence or absence of the card in the adaptor can easily be checked for.

Since the card connection adaptor is constructed such that the indication mechanism per se can be seen from the opening of the card slot, it can easily be checked whether the card connection adaptor or a card compliant with the first standard is connected to the card slot.

The indication mechanism may include a switch member which is operative when the second-standard-compliant card is fitted in the card retaining space, and an indication lamp provided on the rear face of the adaptor as seen in the adaptor insertion direction and adapted to be energized or de-energized by the switch member.

With this arrangement, the switch member is operative in response to the insertion of the card into the card retaining space of the card connection adaptor, whereby the indication lamp is turned on and off. The indication lamp may be powered from an internal power source such as a battery incorporated in the card connection adaptor. When the card connection adaptor is not connected to the card slot, it is easy to check for the presence or absence of the card in the adaptor. Therefore, it is preferred to employ such a construction that the indication lamp is powered from the card slot and the power supply to the indication lamp is effected only when the card connection adaptor is fitted in the card slot.

The indication mechanism may include a displacement member which is displaceable in response to insertion or withdrawal of the card with respect to the card retaining space, and a visual mechanism for allowing visual observation of the displacement of the displacement member from the outside of the housing on the rear face of the adaptor as seen in the adaptor insertion direction.

With this arrangement, the displacement of the displacement member in response to the insertion and withdrawal of the card with respect to the card retaining space can be observed from the outside of the housing by means of the visual mechanism and, therefore, the presence or absence of the card in the card retaining space can easily be checked for.

The displacement member may be, for example, a spring member which is deformable in abutment against the card inserted into the card retaining space. In this case, the visual mechanism includes a window formed in the rear face of the housing, and an indicator member which is displaceable in response to the deformation of the spring member inside the window so as to get into or out of sight from the window. The indicator member is preferably imparted with a conspicuous color (e.g., a color different from the color of the rear face of the housing, or a fluorescent color). Further, the indicator member may be a part of the spring member or a separate member attached to the spring member.

The displacement member may be displaceable in the card insertion direction. In this case, the displacement member may be operative in abutment against a front face of the card.

The displacement member may be displaceable generally perpendicularly to the card insertion direction (e.g., along a line extending through the upper and lower faces of the card-shaped card connection adaptor). In this case, the displacement member may be displaced by either of the upper and lower faces of the card.

The displacement member may include an engagement member which is engageable with an engagement portion formed in a side face of the card, whereby the displacement member is displaced by the insertion or withdrawal of the card.

Further, the indication mechanism may include a card visual mechanism for allowing visual observation of the card retained in the card retaining space from the outside of the housing on the rear face of the adaptor as seen in the adaptor insertion direction.

With this arrangement, the card retained in the card retaining space can be observed from the rear face of the adaptor by means of the card visual mechanism. Thus, a user can perceive the presence or absence of the card in the adaptor.

In this case, the card visual mechanism may include a window extending through the rear face of the housing to the card retaining space. In this arrangement, at least the periphery of the window in the rear face of the housing is preferably imparted with a color which is distinguishable from the color of the card. Further, the visibility may be enhanced by imparting the housing per se with a color different from the color of the card or by imparting a portion of the card opposed to the window with a color different from the color of the rear face of the housing. The visibility may further be enhanced by fitting a lens in the window.

The foregoing and other objects, features and effects of the present invention will become more apparent from the following description of the preferred embodiments with reference to the attached drawings.

BRIEF DESCRIPTION OF THE DRAWINGS

FIG. 7 is an enlarged sectional view illustrating an arrangement adjacent to a switch terminal;

FIG. 16 is a plan view illustrating a card fitted state;

FIG. 22 is an exploded perspective view illustrating an arrangement adjacent to a slide block;

FIG. 24 is a perspective view illustrating the construction of a ring spring;

FIGS. 26A and 26B are sectional views taken along a section line XXVI—XXVI in FIG. 25;

FIG. 27 is a perspective view illustrating an arrangement adjacent to a depressible beam;

FIG. 30 is a conceptual diagram illustrating further another embodiment of the present invention.

DESCRIPTION OF THE PREFERRED EMBODIMENTS

Figure 1:
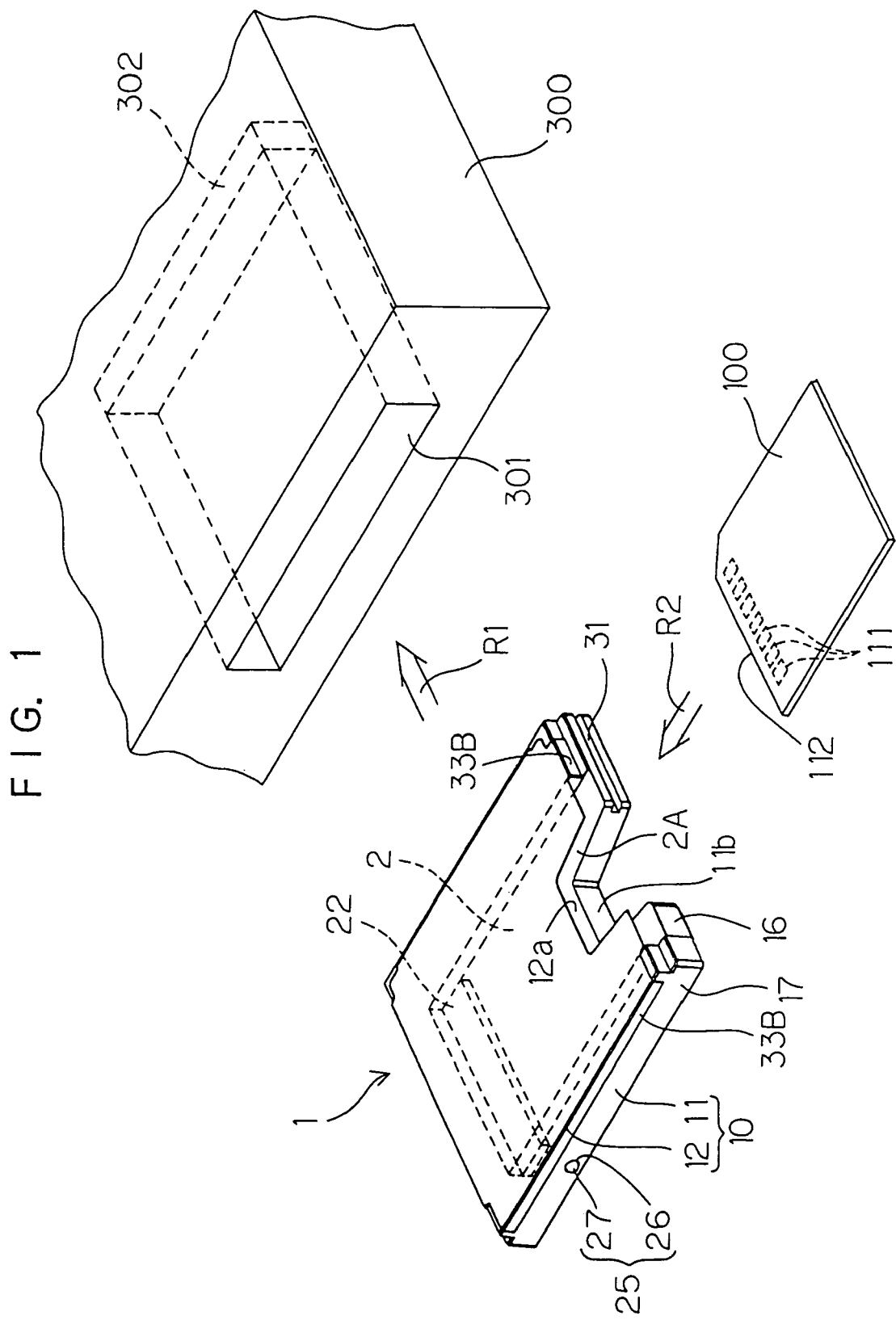
FIG. 1 is a perspective view illustrating the external construction of a card connection adaptor according to one embodiment of the present invention.
Figure 2:
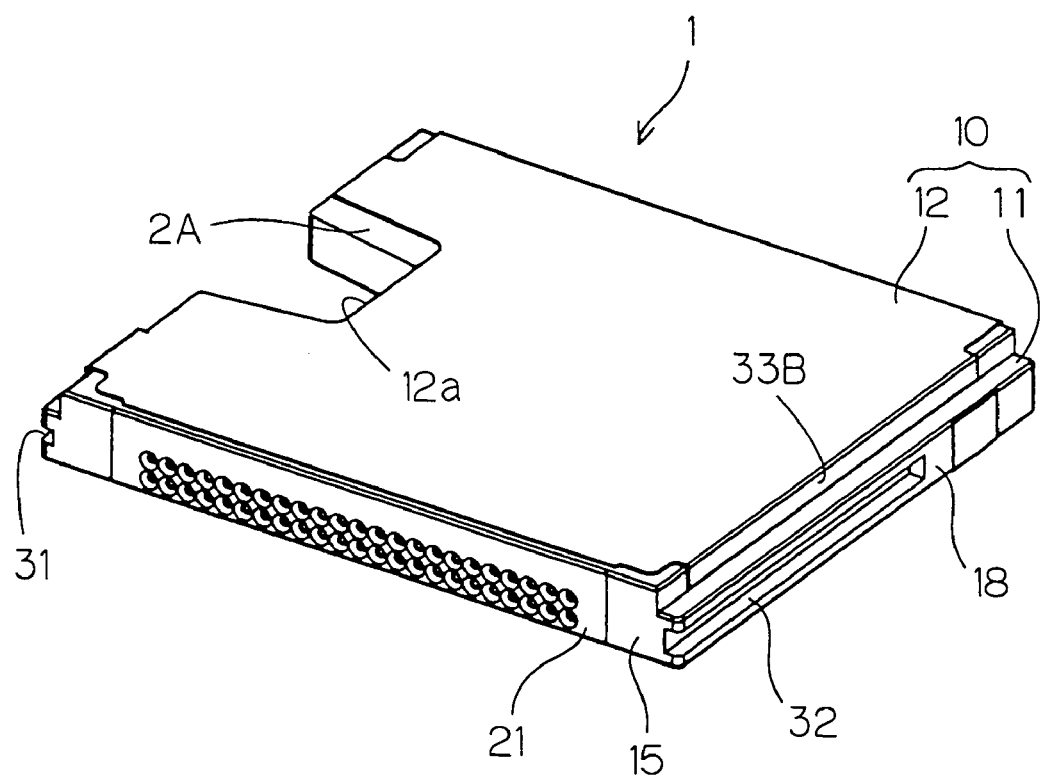
FIG. 2 is an enlarged perspective view illustrating the card connection adaptor of FIG. 1 after 180-degree rotation thereof about a vertical axis.

FIG. 1 is a perspective view illustrating the external construction of a card connection adaptor 1 according to one embodiment of the present invention, and FIG. 2 is an enlarged perspective view illustrating the card connection adaptor 1 of FIG. 1 after 180-degree rotation thereof about a vertical axis.

The card connection adaptor 1 (hereinafter referred to simply as "adaptor 1") has an outside shape conformal to a card compliant with the CF Card Standard (first standard), i.e., CF card. The adaptor 1 has a card retaining space 2 for retaining therein a card 100 compliant with the MultiMedia Card Standard (second standard), i.e., MultiMedia card. When the card 100 is inserted in the card retaining space 2 for connection of the card 100 to the adaptor 1, the card 100 is accommodated within the card retaining space 2 without outward projection, so that the adaptor 1 connected to the card 100 constitutes the CF card as a whole. Therefore, the adaptor 1 can be fitted in a CF card slot 301 provided in an information system 300 such as an electronic organizer.

The adaptor 1 includes a housing 10 which has a card-like outside shape defined by a resin frame 11 and metal covers 12 and 13 (see FIG. 3) respectively covering upper and lower faces of the frame 11 (in a state as shown in FIG. 1 or 2). A female connector 21 (first connector) which is to be contact-connected to a male connector 302 provided in the CF card slot 301 is provided on a front face 15 of the housing 10. The card retaining space 2 formed in the housing 10 has a card insertion port 2A which opens into one side face 16 of the housing 10 adjoining to the face 15. The card retaining space 2 is closed except the side face 16, so that insertion and withdrawal of the card 100 can be achieved only through the card insertion port 2A.

The card 100 is a generally rectangular thin planar card having a memory IC resin-sealed therein and a plurality of terminals (seven terminals) 111 exposed on a bottom face thereof. The card 100 is dimensioned in compliance with the MultiMedia Card Standard as having a length of 32 mm, a width of 24 mm and a thickness of 1.4 mm. The terminals 111 are arranged in a line along a front edge 112 of the card 100. One corner on the front edge 112 of the card 100 is beveled so as to prevent the card 100 from being inserted into the adaptor 1 in a wrong posture.

A card connector (second connector) 22 which is to be electrically connected to the terminals 111 of the card 1 is disposed in the innermost of the card retaining space 2 (as seen from the card insertion port 2A).

Therefore, the card 100 is mechanically and electrically connected to the adaptor 1 by inserting the card 100 into the adaptor 1 from the card insertion port 2A. When the adaptor 1 with this state is inserted into the CF card slot 301 for mechanical and electrical connection thereto, the card 100 is mechanically and electrically connected to the CF card slot 301 via the adaptor 1.

The slot connector 21 which is to be connected to the CF card slot 301 is provided on the front face 15 to be opposed to the CF card slot 301. Since the card insertion port 2A for insertion of the card 100 is formed on the side face 16, an adaptor insertion direction R1 in which the adaptor 1 is inserted into the CF card slot 301 is perpendicular to a card insertion direction R2 in which the card 100 is inserted into the adaptor 1. Therefore, a rear face 17 of the housing 10 is exposed from the CF card slot 301 when the adaptor 1 is fitted in the CF card slot 301. That is, the card retaining space 2 is closed to the outside by the rear face 17.

This prevents the card 100 from being inadvertently disconnected from the adaptor 1 fitted in the CF card slot 301. Since the insertion and withdrawal of the card 100 is not possible with the adaptor 1 being fitted in the CF card slot 301, there is no fear of exerting a large external force on the connector 302 of the CF card slot 301, and the card 100 is prohibited from being inadvertently withdrawn from the adaptor by a user. The insertion and withdrawal of the card 1 is possible only when the adaptor 1 is removed from the CF card slot 301. Therefore, there is no need to provide a guarantee against the insertion and withdrawal of the card 1 in a power active state where the adaptor 1 is electrically connected to the information system 300 (i.e., active insertion and withdrawal). This is advantageous in that the adaptor 1 is easier to design.

Another feature of the adaptor 1 according to this embodiment is provision of an indication mechanism 25 for providing an indication of whether or not the card 100 is fitted in the adaptor 1 on the rear face 17 of the housing 10. The indication mechanism 25 includes a light emitting diode 27 provided in a window 26 formed in the rear face 17, and a switch mechanism (which will be described later) for establishing continuity when the card 100 is retained in the card retaining space 2 for connection to the adaptor 1.

With the adaptor 1 being fitted in the CF card slot 301, the rear face 17 of the adaptor 1 is exposed from the CF card slot 100 and, therefore, it is impossible to visually check whether or not the card 100 is retained in the card retaining space 2. In this embodiment, the light emitting diode 27 is energized via the aforesaid switch mechanism when the card 100 is fitted in the adaptor 1, so that the presence or absence of the card 100 in the adaptor 1 is indicated by a lit or unlit state of the light emitting diode 27.

The construction of the adaptor 1 will hereinafter be described in greater detail.

Figure 3:
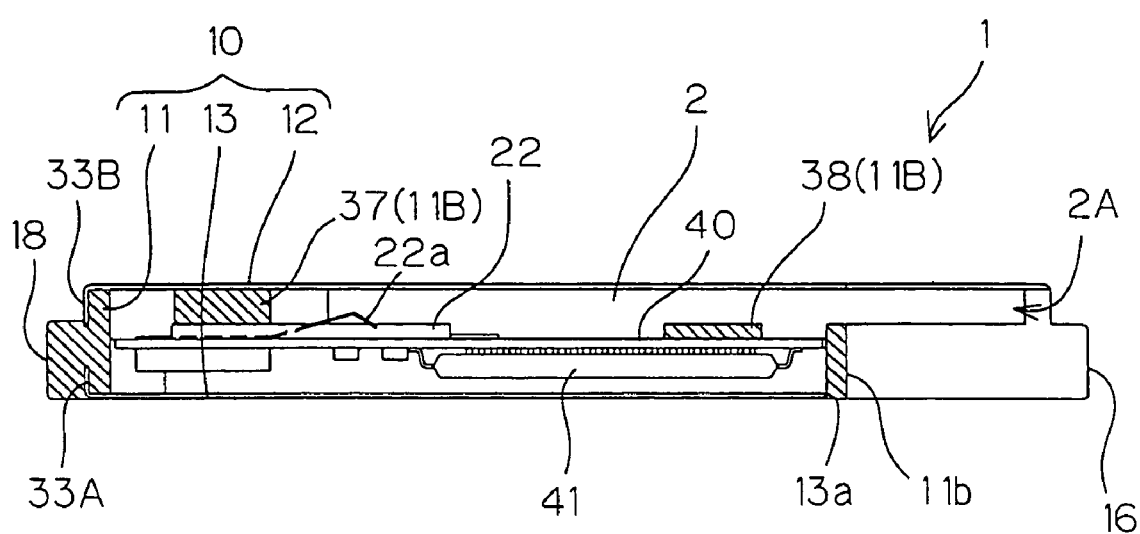
FIG. 3 is a sectional view of the card connection adaptor taken along a section line extending in a card insertion direction.
Figure 4:
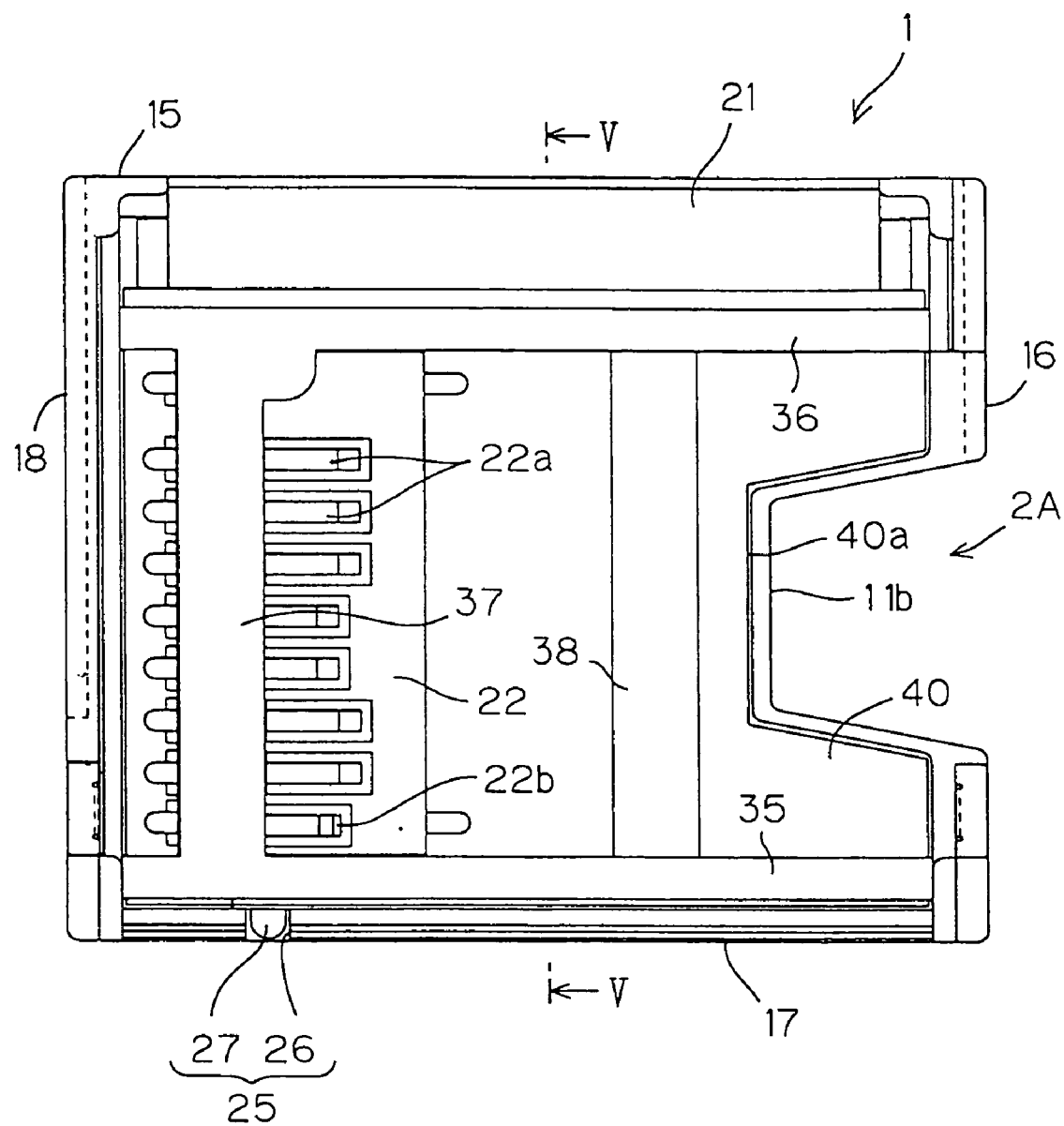
FIG. 4 is a plan view illustrating the internal construction of the adaptor as viewed through an upper metal cover.

FIG. 3 is a sectional view taken along a section line extending in the card insertion direction R2, and FIG. 4 is a plan view illustrating the internal construction of the adaptor 1 as viewed through the upper metal cover 12. Further, FIG. 5 is a sectional view taken along a section line V—V in FIG. 4.

The frame 11 includes a frame body 11A and a press frame 11B. The frame body 11A is of a generally U-shape in plan, and has an opening on the front face 15 of the adaptor 1. The opening serves as a connector mounting portion on which the slot connector 21 is mounted. The frame body 11A has a wiring board support step 11a formed on an inside wall thereof adjacent to the rear face 17.

Key ways 31 and 32 (see FIGS. 1 and 2) for guiding the adaptor 1 into the CF card slot 301 in engagement with keys (not shown) provided on side walls of the CF card slot 301 are provided on opposite side faces 16 and 18, respectively, of the frame 11. The metal covers 12 and 13 have a press-fit portion 33A and an engagement portion 33B, respectively, which are bent toward the frame body 11A. The press-fit portion 33A is press-fitted in a press-fit groove formed in a corresponding portion of the frame body 11A, and the engagement portion 33B is engaged with an engagement step formed in a corresponding portion of the frame body 11A. Thus, the metal covers 12, 13 are integrated with the frame body 11A.

Figure 5:
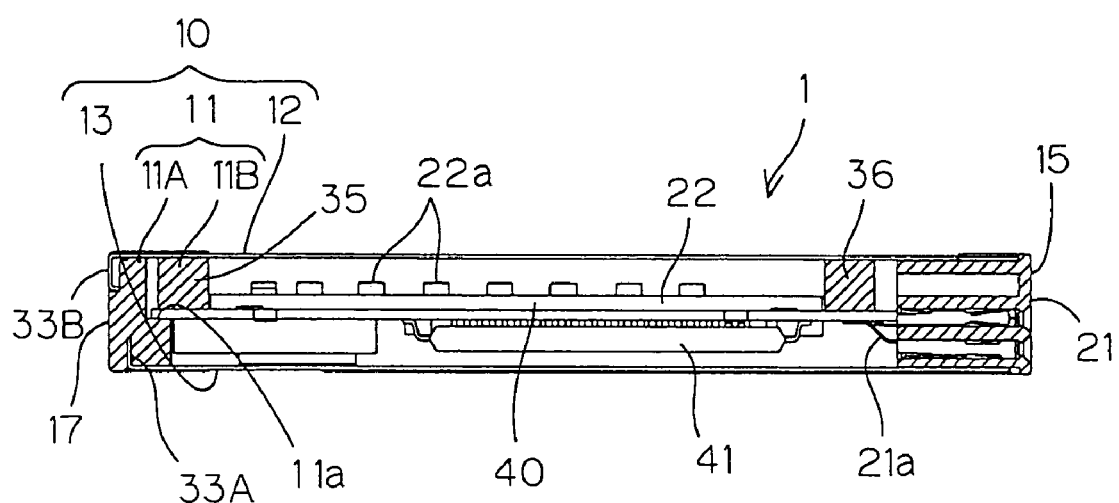
FIG. 5 is a sectional view taken along a section line V—V in FIG. 4.

As shown in FIG. 5, the wiring board support step 11a of the frame body 11A supports one of opposite edge portions of a generally rectangular wiring board 40. Leads 21a of the slot connector 21 are soldered on the other edge portion of the wiring board 40, whereby the slot connector 21 is mechanically and electrically connected to the wiring board 40. Since the slot connector 21 is retained between the upper and lower metal covers 12, 13, the aforesaid other edge of the wiring board 40 is supported via the slot connector 21. The card connector 22 is mounted adjacent an edge of the wiring board 40 opposite to the card insertion port 2A.

The press frame 11B is a resin-molded frame having a ladder-like plan shape. The press frame 11B includes a pair of board press beams 35, 36 which respectively press the opposite edge portions of the wiring board 40 adjacent to the slot connector 21 and the wiring board support step 11a. The press frame 11B further includes a connector press portion 37 linked to the pair of board press beams 35, 36 and pressing the card connector 22 against the wiring board 40, and a guide 38 linked to the pair of board press beams 35, 36 adjacent the card insertion port 2A and pressing the wiring board 40 toward the lower metal cover 13, the guide 38 having an upper surface on which the card 100 is guided for insertion and withdrawal thereof.

An upper surface of the press frame 11B abuts against the upper metal cover 12, whereby the one edge portion of the wiring board 40 is held between the board support step 11a of the frame body 11A and the board press beam 35, and the slot connector 21 supporting the other edge portion of the wiring board 40 is pressed against the lower metal cover 13. Further, the card connector 22 is pressed against the wiring board 40 by the connector press portion 37, and a portion of the wiring board 40 adjacent to the card insertion port 2A is pressed toward the lower metal cover 13 by the guide 38. Thus, the respective components of the adaptor 1 are firmly integrated.

The upper and lower metal covers 12, 13 and the wiring board 40 have conformal trapezoidal cut-away portions 12a, 13a and 40a, respectively, provided adjacent the middle of the card insertion port 2A. The frame body 11A has a trapezoidal recessed portion 11b provided conformally to the cut-away portions 12a, 13a, 40a adjacent the middle of the card insertion port 2A. Thus, the card 100 fitted in the card retaining space 2 can readily be withdrawn from the adaptor by holding a rear portion thereof exposed from the cut-away portions 12a, 13a. The cut-away portions 12a, 13a may have any other configuration such as a semi-circular configuration which permits a user to hold the card easily.

The card retaining space 2 is virtually defined by a lower face of the upper metal cover 12, a side face of the connector press portion 37 of the press frame 11B adjacent to the card insertion port 2A, an upper face of the guide 38, inward side faces of the pair of board press beams 35, 36 and an upper face of the card connector 22. The card 100 inserted from the card insertion port 2A is guided by the lower face of the upper metal cover 12 and the upper face of the frame body 11A (upper face of the recessed portion 11b), then by the upper face of the guide 38, and by the upper face of the card connector 22, whereby the card is fitted in the adaptor 1 with the terminals 111 being electrically connected to terminals 22a of the card connector 22.

Figure 6:
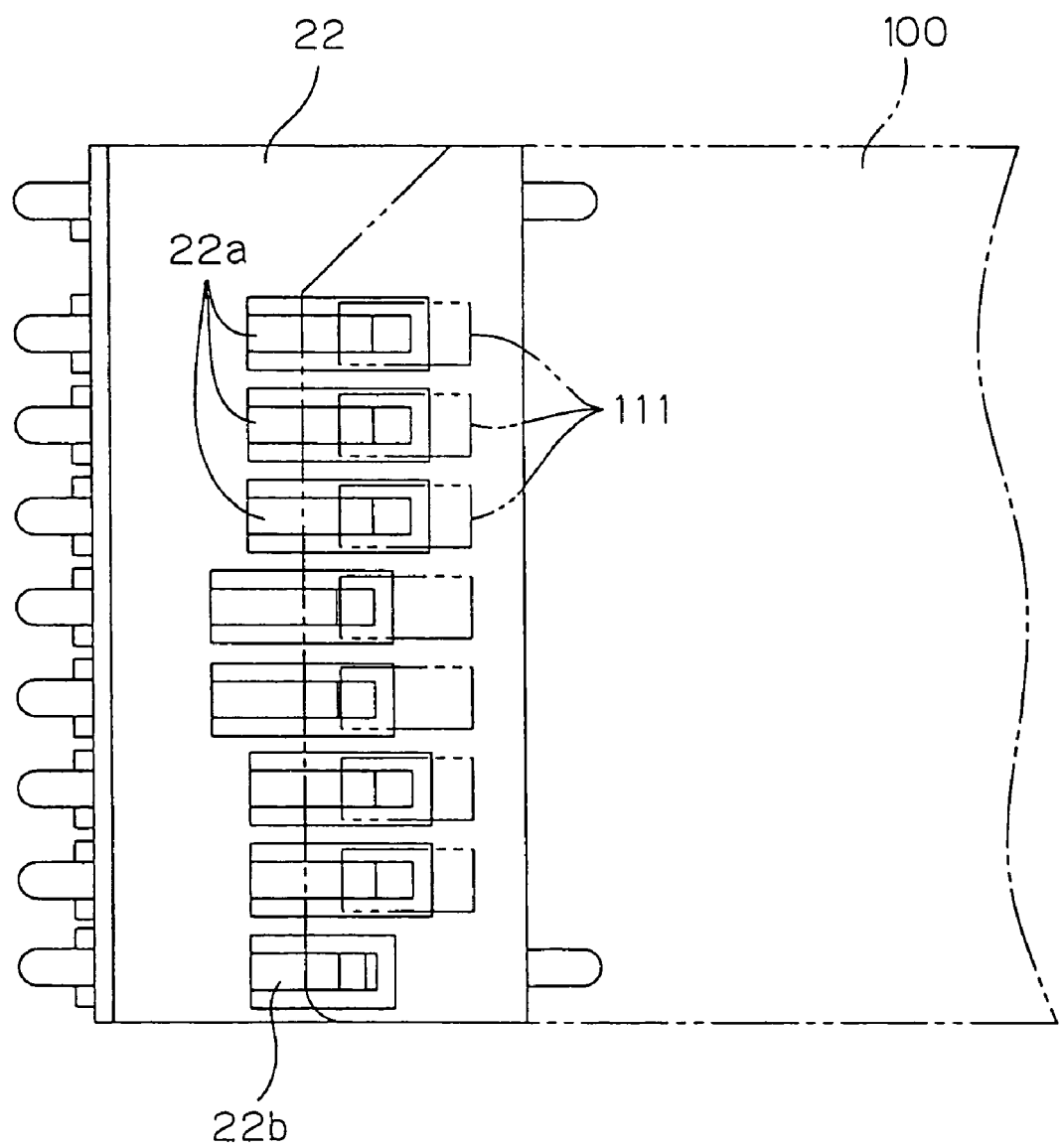
FIG. 6 is a plan view illustrating the construction of a card connector.

FIG. 6 is a plan view illustrating the construction of the card connector 22. The card connector 22 includes seven terminals 22a corresponding to the seven terminals 111 provided on the bottom face of the card 100, and one switch terminal 22b to be brought into abutment against a resin portion of the bottom face of the card 100. The switch terminal 22b constitutes the switch mechanism as one component of the indication mechanism 25. The terminals 22a, 22b are each comprised of a conductor having a spring-like property. When the card 100 is inserted into the card retaining space 2, the terminals 22a, 22b are brought into abutment against the bottom face (the terminals 111 and the resin portion) of the card 100, and resiliently deformed toward the wiring board 40, whereby the insertion of the card 100 is permitted. The seven terminals 22a are pressed against the corresponding terminals 111 of the card 100 by their spring force to establish the electrical connection therebetween. The seven terminals 22a are connected to circuitry formed on the wiring board 40.

FIG. 7 is an enlarged sectional view illustrating an arrangement adjacent to the switch terminal 22b. The switch terminal 22b is connected to the light emitting diode 27 via a circuit interconnection formed on the wiring board 40. The switch terminal 22b has a middle portion as a card abutment portion 221 projecting toward the card retaining space 2, and a tip 222 as a contact. A contact 28 is provided on an upper surface of the wiring board 40 facing to the card retaining space 2 in a position opposed to the tip 222 of the switch terminal 22b. The contact 28 is connected to a power line of the circuitry formed on a lower face of the wiring board 40 via a through-hole (not shown). The power line is an interconnection line to which a source voltage is applied from the information system 300 via the slot connector 21 when the adaptor 1 is fitted in the CF card slot 301.

When the card 100 is fitted in the card retaining space 2, the switch terminal 22b is resiliently deformed downward to be brought into abutment against the contact 28. When the adaptor 1 with this state is fitted in the CF card slot 301, the light emitting diode 27 is powered via the slot connector 21, the power line, the switch terminal 22b and the like, whereby the light emitting diode 27 is lit. Thus, the light emitting diode indicates that the card 100 is fitted in the adaptor 1.

Figure 8:
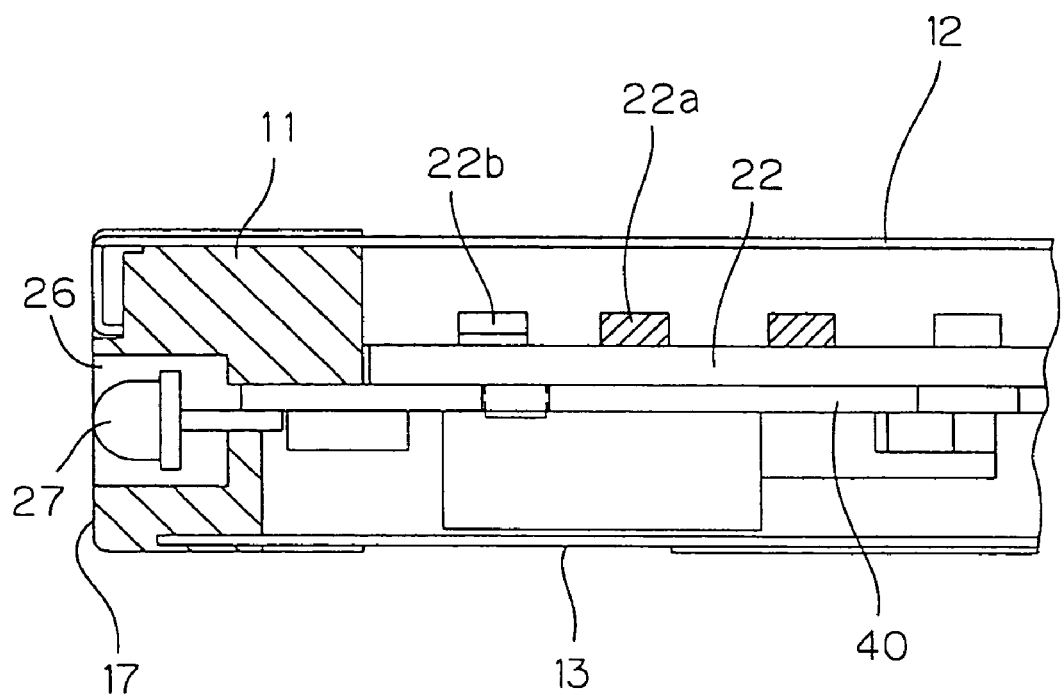
FIG. 8 is a sectional view showing the position of a light emitting diode.

As shown in FIG. 8, the light emitting diode 27 is mounted on the wiring board 40 in such a position that the diode is exposed from the window 26 formed in the rear face 17 of the housing 10.

A battery may be incorporated in the adaptor 1 so that the light emitting diode 27 can be powered from the battery. Thus, even if the adaptor 1 is not retained in the CF card slot 301, the presence or absence of the card 100 in the adaptor 1 can be indicated by the lit or unlit state of the light emitting diode 27. However, the indication by the light emitting diode 27 is not necessarily required when the adaptor 1 is not retained in the CF card slot 301, because the card retaining space 2 can be viewed from the card insertion port 2A. From the viewpoint of simplification of the construction, the former arrangement is more preferable in which the adaptor 1 does not incorporate a battery therein but is adapted to be powered from the CF card slot 301.

Figure 9:
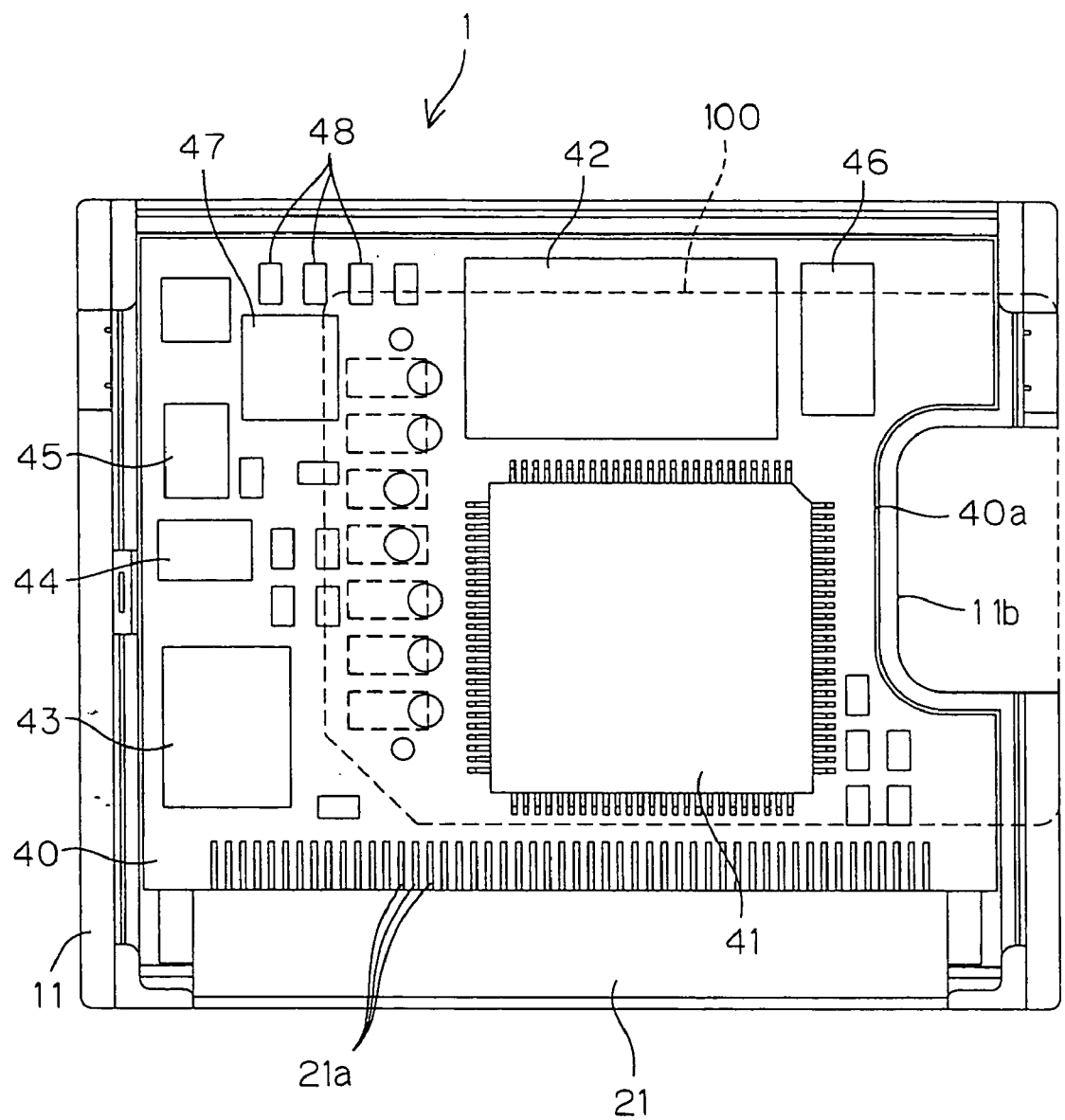
FIG. 9 is a bottom view illustrating the internal construction of the adaptor as viewed through a lower metal cover.

FIG. 9 is a bottom view illustrating the internal construction of the adaptor 1 as viewed through the lower metal cover 13. Signal conversion circuitry for performing signal conversion between a first-standard-compliant signal and a second-standard-compliant signal is provided on the lower surface of the wiring board 40 on a side thereof opposite to the card retaining space 2. More specifically, a control IC 41, an EEPROM 42, a power source IC 43, a filtering circuit 44, electrolytic capacitors 45, 46, an oscillator circuit 47, and other circuit elements 48 such as a chip resistor and a chip capacitor are mounted on the wiring board 40 to constitute the signal conversion circuitry. Interconnection conductor lines (not shown) as circuit interconnections are provided on the surface of the wiring board 40.

The signal conversion circuit performs pin configuration conversion between the slot connector 21 compliant with the first standard and the card connector 22 compliant with the second standard, and performs a signal processing operation for signal format conversion between these standards. The signal conversion circuitry includes an input/output control circuit for controlling data input and output of the card 100 which incorporates therein the memory IC.

The MultiMedia card and the CF card have a 7-pin configuration and a 50-pin configuration, respectively, with different numbers of pins. Therefore, at least some of signals transferred therebetween should be altered, because the signal conversion cannot be achieved only through the simple pin configuration conversion.

Figure 10:
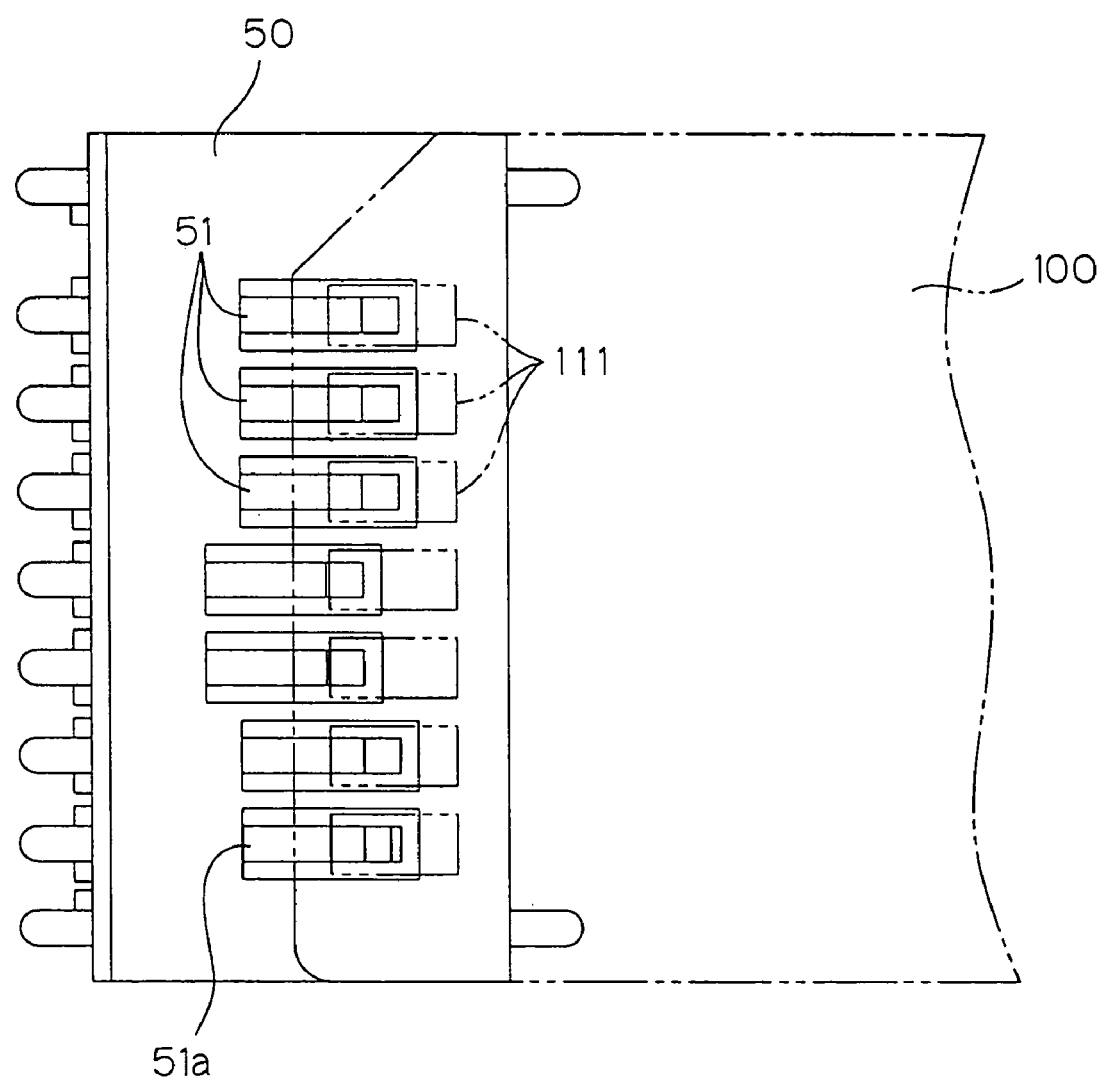
FIG. 10 is a plan view illustrating the construction of a card connector used in a second embodiment of the present invention.

FIG. 10 is a plan view illustrating the construction of a card connector used for connection to the MultiMedia card in a second embodiment of the present invention. For explanation of this embodiment, reference is made again to FIGS. 1 through 5, 8 and 9.

Figure 11:
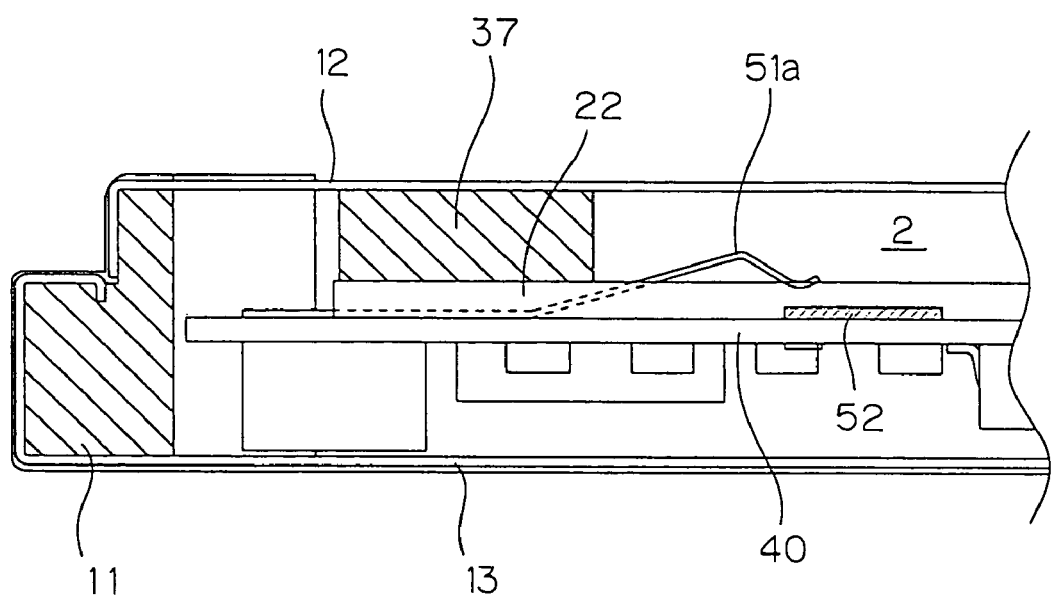
FIG. 11 is a sectional view illustrating the construction of terminals of the connector.

The card connector 50 used in this embodiment has terminals 51 of the same number as that of the terminals 111 of the card 100 (i.e., seven terminals 51). Among these terminals, a terminal 51a through which a source voltage is supplied to the card 100 serves for double purpose as a switch terminal. More specifically, the terminal 51a has the same construction as the switch terminal 22b in the first embodiment previously described, as shown in FIG. 11, and a contact 52 (of the same construction as the contact 28 in the first embodiment) connected to the light emitting diode 27 is provided on the wiring board 40.

When the card 100 is inserted into the card retaining space 2, the terminals 51 are resiliently deformed to be brought into press contact with the terminals 111. At this time, the tip of the terminal 51a abuts against the contact 52. When the adaptor with this state is fitted in the CF card slot 301, a source voltage from the information system 300 is supplied to the terminal 51a and, in turn, to the light emitting diode 27 via the contact 52.

In this embodiment, the light emitting diode 27 can be switched between a power-on state and a power-off state by using the single terminal for electrical connection to the card 100.

Figure 12:
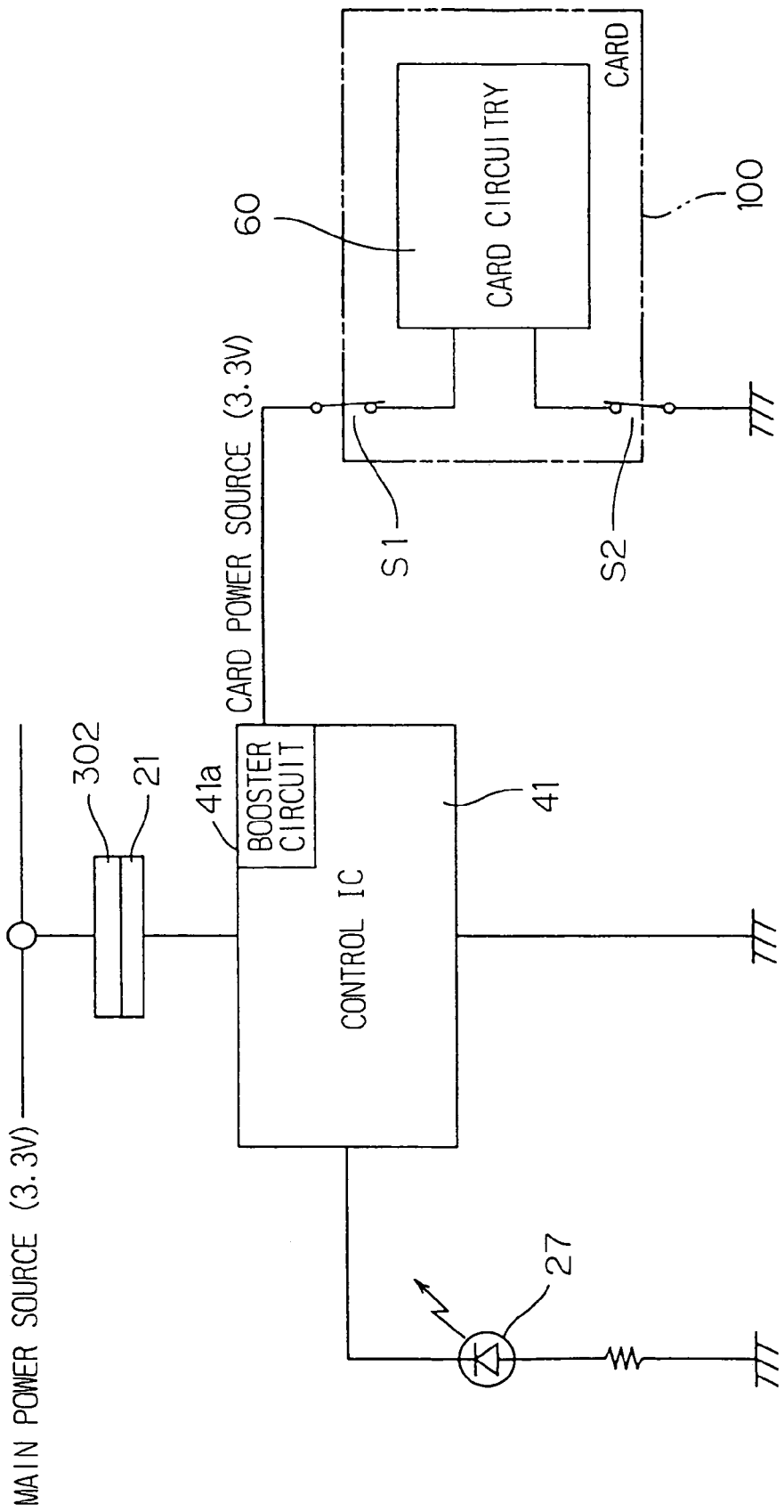
FIG. 12 is a block diagram for explaining a third embodiment of the present invention.

FIG. 12 is a block diagram for explaining a third embodiment of the present invention. For the explanation of this embodiment, reference is made again to FIGS. 1 through 5 and 8 through 11. The third embodiment employs a card connector having substantially the same construction as the card connector 50 shown in FIG. 10, but there is no need to provide the terminal serving for double purpose as the switch terminal. The terminals 51 to be brought into one-to-one correspondence with the terminals 111 may be arranged so that connection only to the corresponding terminals 111 can be established. Accordingly, there is no need to provide the contact 52 on the wiring board 40.

In the third embodiment, the control IC 41 is employed for controlling the power supply to the light emitting diode 27. The control IC 41 boosts the source voltage supplied from the information system 300 via the slot connector 21 by means of a booster circuit 41a, and supplies the voltage to the card 100. When the card 100 is inserted into the card retaining space 2, the seven terminals 51 are respectively connected to the terminals 111 of the card 100, and the card 100 is connected to the control IC 41 via some of the terminals 51. In FIG. 12, connection of a source voltage supply terminal and a grounding terminal out of the terminals 51 to corresponding terminals 111 of the card 100 is symbolically illustrated by closed switches S1, S2.

When the adaptor 1 fitted with the card 100 is fitted in the CF card slot 301, the source voltage is supplied to the control IC 41 from the information system 300 via the connector 302 and the slot connector 21. In response thereto, the control IC 41 supplies the source voltage to the card 100 via the booster circuit 41a.

The control IC 41 constantly checks whether the power is supplied to the card 100 from the booster circuit 41a. If there is a power supply from the booster circuit 41a, a driving voltage is applied to the light emitting diode 27 for illumination thereof. If there is no power supply from the booster circuit 41a, the application of the driving voltage to the light emitting diode 27 is not effected.

In accordance with this embodiment, the light emitting diode 27 is turned on or off for the indication of the presence or absence of the card 100 in the adaptor with the use of the control IC 41 without any special modification to the card connector to be connected to the terminals 111 of the card 100.

Figure 13:
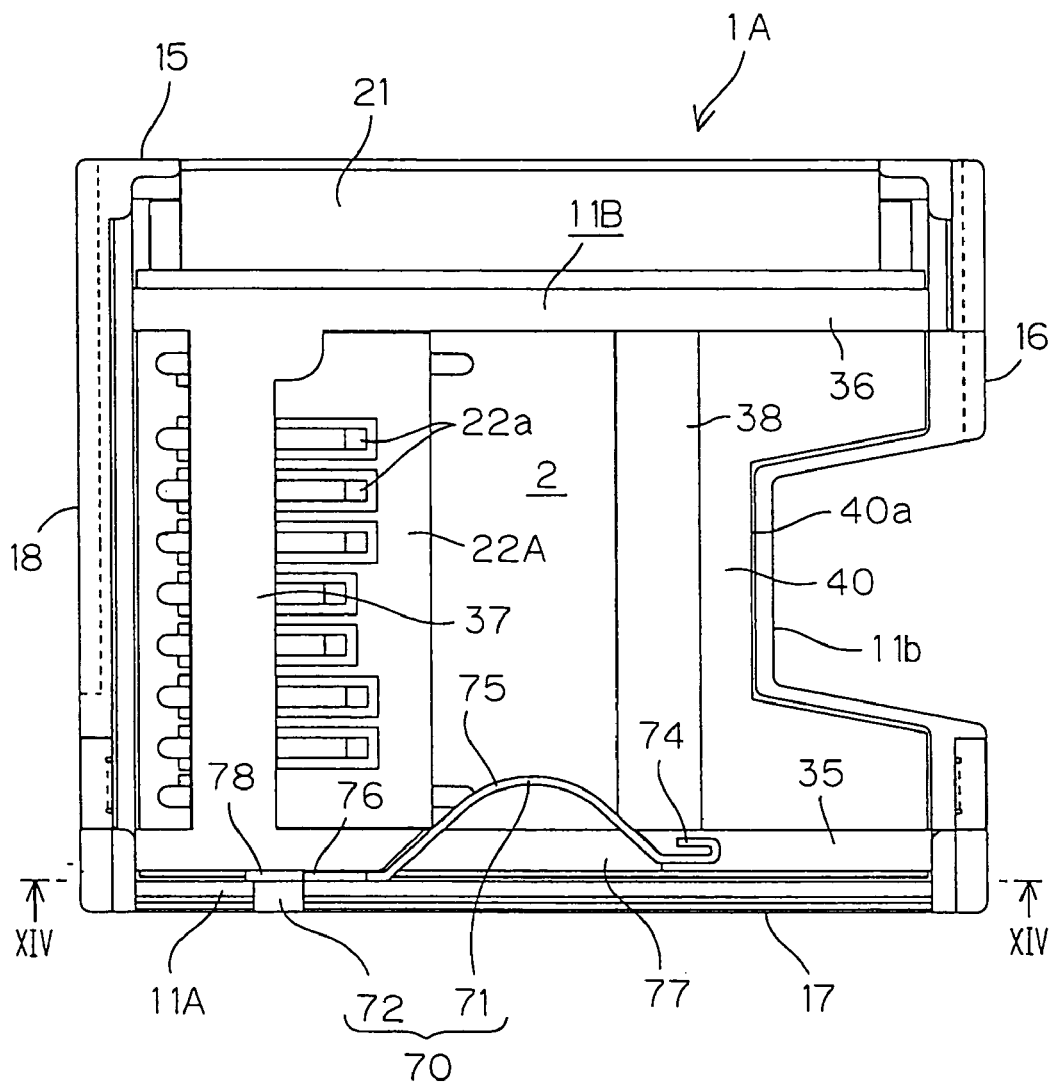
FIG. 13 is a plan view illustrating the internal construction of a card connection adaptor according to a fourth embodiment of the present invention.
Figure 14:
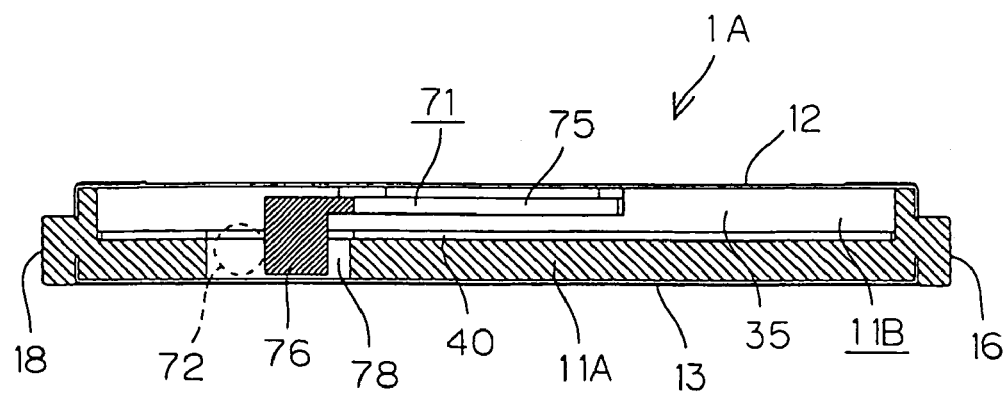
FIG. 14 is a sectional view taken along a section line XIV—XIV in FIG. 13.

FIG. 13 is a plan view illustrating the internal construction of a card connection adaptor according to a fourth embodiment of the present invention. FIG. 14 is a sectional view taken along a section line XIV—XIV in FIG. 13. In FIGS. 13 and 14, like components corresponding to those shown in FIGS. 1 through 9 are denoted by like reference characters.

A difference between the card connection adaptor 1A (hereinafter referred to simply as "adaptor 1A") according to the fourth embodiment and the adaptor 1 according to the first embodiment resides in the construction of the indication mechanism for providing an indication of the presence or absence of the card 100 in the adaptor on the rear face 17 of the housing 10 (frame 11).

Figure 15:
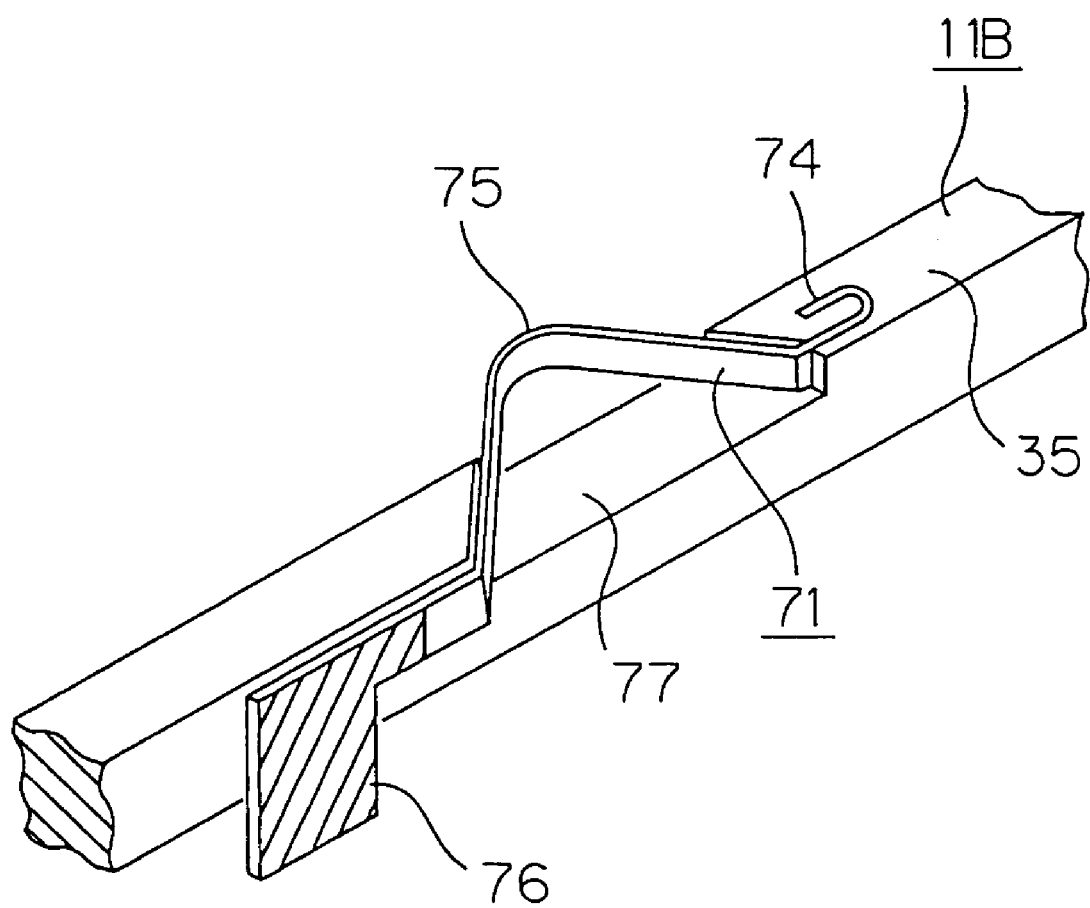
FIG. 15 is a perspective view illustrating an arrangement adjacent to a flat spring.

More specifically, the indication mechanism 70 of the adaptor 1A of this embodiment includes a flat spring 71 attached to the press frame 11B, and a window 72 formed in the rear face 17 of the housing 10 (frame 11). As shown in a perspective view of FIG. 15, the flat spring 71 has a fixed portion 74 fixed to the press frame 11B, an arcuate portion 75 projecting into the card retaining space 2 from the fixed portion 74, and a slide portion 76 provided at a free end thereof on a side of the arcuate portion 75 opposite to the fixed portion 74 and adapted to be slidingly displaced along a guide groove 78 formed in the frame body 11A between the press frame 11B and the frame body 11A. The press frame 11B is formed with a step portion 77 holding the arcuate portion 75 in a displaceable manner.

The slide portion 76 has a rectangular shape and a size sufficient to cover the window 72, and is imparted with a color (preferably a fluorescent color) distinguishable from the color of the frame body 11A as indicated by hatch. The coloration of the slide portion 76 may be achieved by color painting or application of a color sheet, or by forming the flat spring 71 per se and the frame body 11A from different resin materials.

When the card 100 is inserted into the card retaining space 2, a corner on the front edge of the card 100 is brought into abutment against the arcuate portion 75 of the flat spring 71, which is in turn resiliently deformed to be forced into the step portion 77 of the press frame 11B. With the card 100 being completely fitted in the card retaining space 2, the arcuate portion 75 is accommodated in the step portion 77 in a generally straightened state as shown in FIG. 16. The slide portion 76 is slid by the straightening of the arcuate portion 75, so that a positional relationship between the slide portion 76 and the window 72 is changed. Therefore, the construction and mounting position of the flat spring 71 and the position of the window 72 are properly determined so that the slide portion 76 is located apart from the window 72 when the card 100 is not fitted in the adaptor 1A, and is brought into a window covering position upon completion of the insertion of the card 100. Thus, the presence or absence of the card 100 in the adaptor 1A can be indicated by whether or not the colored slide portion 76 is visible from the window 72.

When the card 100 is withdrawn from the card retaining space 2, the flat spring 71 restores the arcuate portion 75 to the original bent state by its own spring force, so that the slide portion 76 is returned into the position apart from the window 72.

In accordance with this embodiment, the indication of the presence or absence of the card 100 in the adaptor 1A can be provided by the mechanical arrangement using the flat spring 71 which is adapted to be resiliently deformed in response to the insertion and withdrawal of the card 100. Since no battery is required, the presence or absence of the card 100 in the adaptor 1A can be indicated even when the adaptor 1A is not fitted in the CF card slot 301.

In this embodiment, a card connector 22A is used which has substantially the same construction as the card connector 22 except that the switch terminal 22b is not provided.

Figure 17:
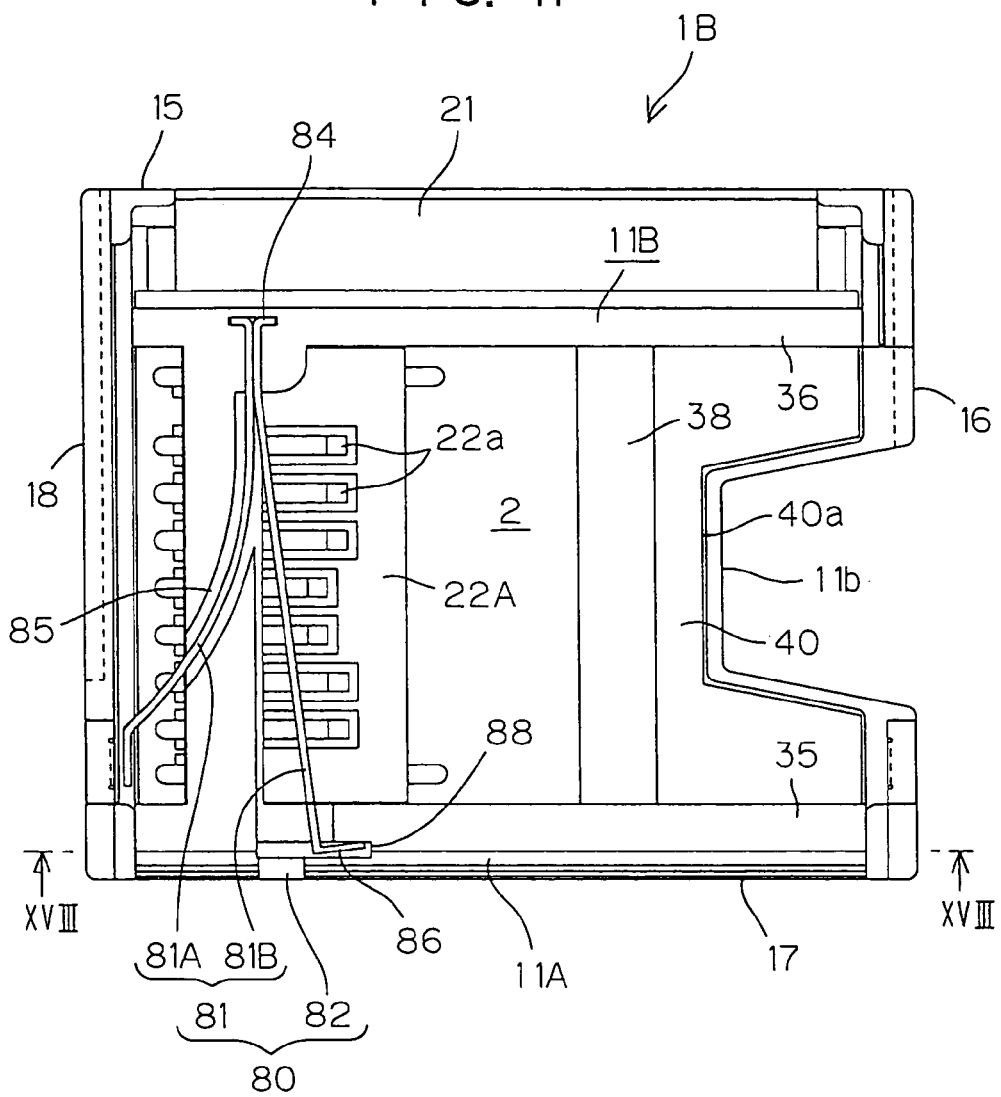
FIG. 17 is a plan view illustrating the internal construction of a card connection adaptor according to a fifth embodiment of the present invention.
Figure 18:
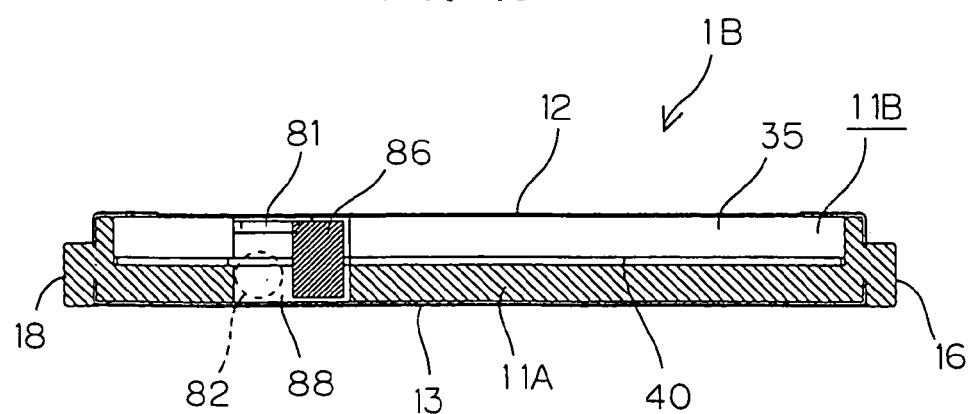
FIG. 18 is a sectional view taken along a section line XVIII—XVIII in FIG. 17.

FIG. 17 is a plan view illustrating the internal construction of a card connection adaptor according to a fifth embodiment of the present invention. FIG. 18 is a sectional view taken along a section line XVIII–XVIII in FIG. 17. In FIGS. 17 and 18, like components corresponding to those shown in FIGS. 13 and 14 are denoted by likereference characters.

The card connection adaptor 1B (hereinafter referred to simply as "adaptor 1B") according to the fifth embodiment is similar to the fourth embodiment. A difference between the adaptor 1B of the fifth embodiment and the adaptor 1A of the fourth embodiment resides in the construction of the indication mechanism for providing an indication of the presence or absence of the card 100 in the adaptor on the rear face 17 of the housing 10 (frame 11).

More specifically, the indication mechanism 80 of the adaptor 1B of this embodiment includes a flat spring 81 attached to the press frame 11B, and a window 82 formed in the rear face 17 of the housing 10 (frame 11). The flat spring 81 has a fixed portion 84 fixed to the press frame 11B, and a pair of spring pieces 81A, 81B diverged from the fixed portion 84 into a generally V-shape. One 81A of the spring pieces extends through a curved step portion 85 formed in the connector press portion 37 of the press frame 11B with its distal end hooked on one edge of the wiring board 40. The other spring piece 81B extends inwardly at an angle into the card retaining space 2 and has a slide portion 86 at its distal end which is adapted to be slidingly displaced along a guide groove 88 formed in the frame body 11A and the press frame 11B between the press frame 11B and the frame body 11A.

The slide portion 86 has a rectangular shape and a size sufficient to cover the window 82, and is imparted with a color (preferably a fluorescent color) distinguishable from the color of the frame body 11A as indicated by hatch. The coloration may be achieved in the same manner as for the slide portion 76 in the fourth embodiment previously described.

Figure 19:
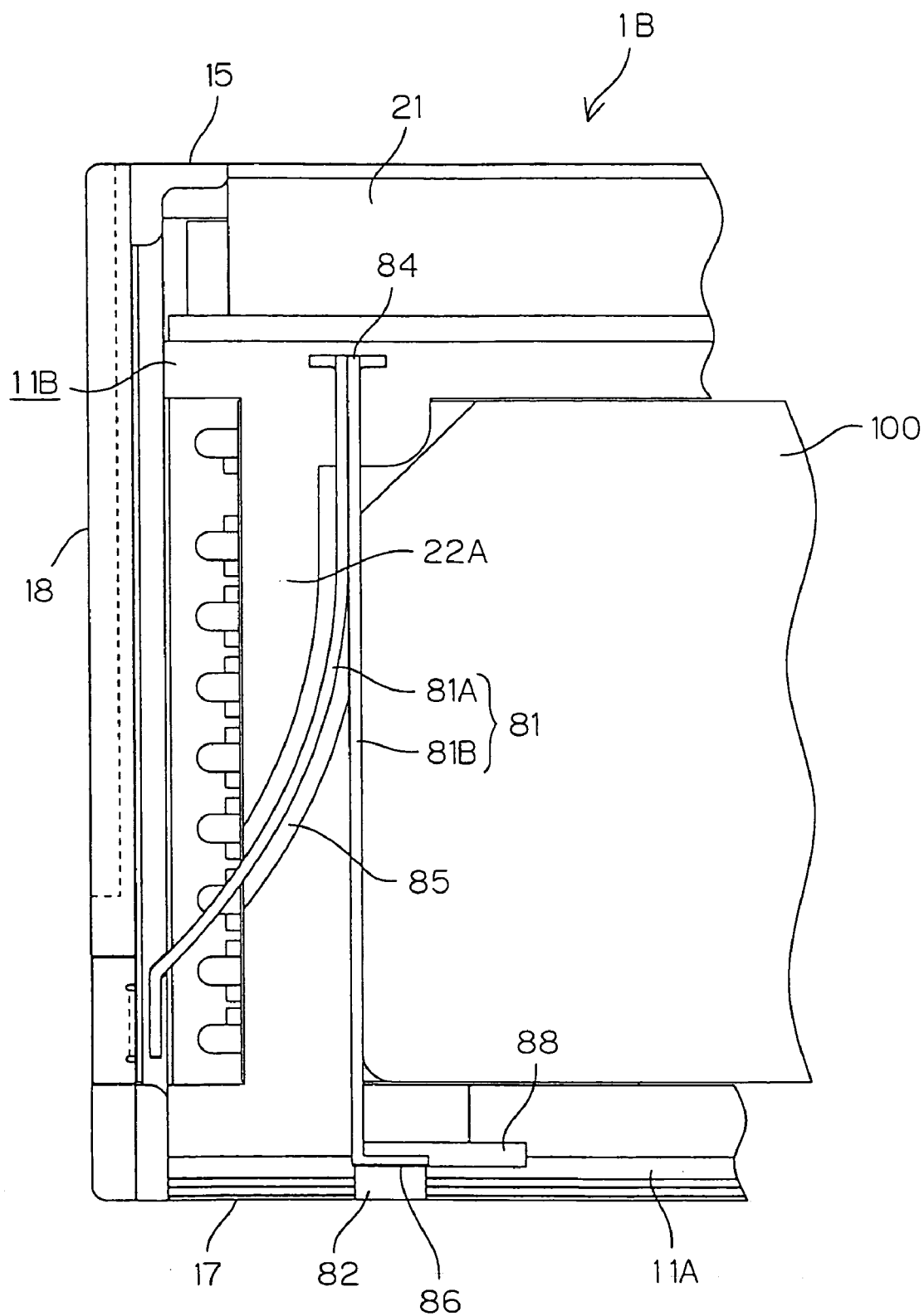
FIG. 19 is a plan view illustrating a card fitted state.

When the card 100 is inserted into the card retaining space 2, a corner on the front edge of the card 100 is brought into abutment against the spring piece 81B of the flat spring 81. By further forcing the card 100 into the card retaining space, the spring piece 81B can resiliently be deformed to be brought into abutment against the side face of the connector press portion 37. With the spring piece 81B abutting against the side face of the connector press portion 37 as shown in FIG. 19, the card 100 is completely accommodated in the card retaining space 2, so that the terminals 111 of the card 100 contact the corresponding terminals 22a of the slot connector 22A.

The slide portion 86 is slid by the resilient deformation of the spring piece 81B, so that a positional relationship between the slide portion 86 and the window 82 is changed. Therefore, the construction of the spring piece 81B and the position of the window 82 are properly determined so that the slide portion 86 is located apart from the window 82 when the card 100 is not fitted in the adaptor 1B, and is brought into a window covering position upon completion of the insertion of the card 100. Thus, the presence or absence of the card 100 in the adaptor 1B can be indicated by whether or not the colored slide portion 86 is visible from the window 82.

When the card 100 is withdrawn from the card retaining space 2, the spring piece 81B is restored into its original shape as projecting at an angle toward the card retaining space 2 by its own spring force, so that the slide portion 86 is returned into the position apart from the window 82.

The arrangement according to this embodiment offers the same effects as in the fourth embodiment previously described.

It is noted that the card 100 fitted in the card retaining space 2 is held between the terminals 22a of the card connector 22A and the upper metal cover 12 by the resilient force of the terminals 22a. The spring force of the flat spring 81 is too weak to cause the terminals 22a and the like to release the card 100.

Figure 20:
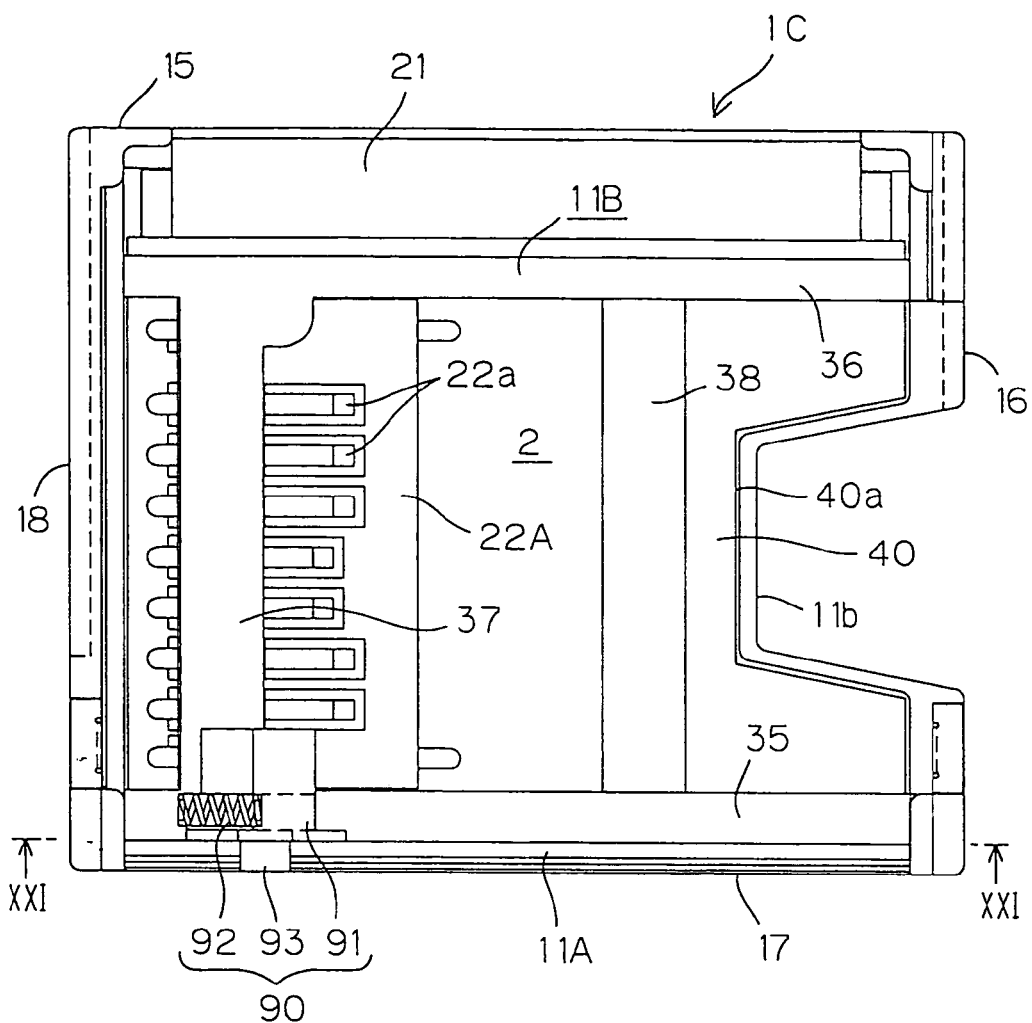
FIG. 20 is a plan view illustrating the internal construction of a card connection adaptor according to a sixth embodiment of the present invention.
Figure 21:
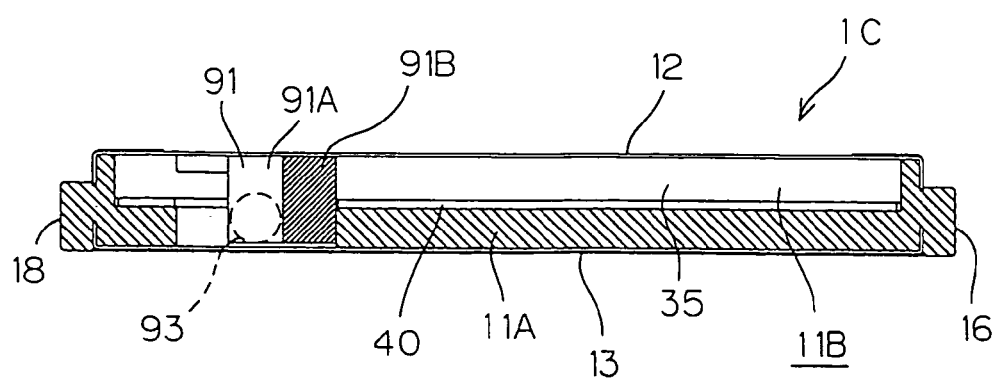
FIG. 21 is a sectional view taken along a section line XXI—XXI in FIG. 20.

FIG. 20 is a plan view illustrating the internal construction of a card connection adaptor according to a sixth embodiment of the present invention. FIG. 21 is a sectional view taken along a section line XXI—XXI in FIG. 20. In FIGS. 20 and 21, like components corresponding to those shown in FIGS. 13 and 14 which illustrate the fourth embodiment are denoted by like reference characters.

A difference between the card connection adaptor 1C (hereinafter referred to simply as "adaptor 1C") according to the sixth embodiment and the adaptor 1A according to the fourth embodiment resides in the construction of the indication mechanism for providing an indication of the presence or absence of the card 100 in the adaptor on the rear face 17 of the housing 10 (frame 11).

More specifically, the indication mechanism 90 of the adaptor 1C of this embodiment includes a slide block 91 slidably engaged with the board press beam 35 of the press frame 11B, a coil spring 92 biasing the slide block 91 in one direction, and a window 93 formed in the rear face 17 of the housing 10 (frame 11).

As shown in FIG. 22, a recess 94 for permitting sliding displacement of the slide block 91 is formed in a portion of the press frame 11B adjacent to a joint between the board press beam 35 and the connector press portion 37. The slide block 91 is fitted in the recess 94, and the compression coil spring 92 is disposed between a face of the slide block 91 on a downstream side with respect to the card insertion direction and an interior wall face of the recess 94 opposed thereto. The slide block 91 includes a rectangular indicator portion 91a fitted on an outer side face of the board press beam 35 (on the side of the rear face 17). The indicator portion 91a has a surface area opposed to the window 93 and divided into two areas, i.e., a non-color area 91A and a color area 91B (indicated by hatch) provided on downstream and upstream sides, respectively, with respect to the card insertion direction. The non-color area 91A and the color area 91B each have a size sufficient to cover the window 93, and the color area 91B is imparted with a color. The coloration may be achieved in the same manner as for the slide portion 76 in the fourth embodiment previously described.

When the card 100 is not fitted in the card retaining space 2, the slide block 91 is biased by the spring force of the compression coil spring 92 thereby to be located in the most upstream position with respect to the card insertion direction, so that the non-color area 91A is located behind the window 93. When the card 100 is inserted into the card retaining space 2, a front edge of the card 100 is brought into abutment against the slide block 91 to displace the slide block 91 against the spring force of the coil spring 92. When the card 100 is completely fitted in the adaptor 1C with the terminals thereof being in contact with the terminals 22a of the card connector 22A, the color area 91B is located behind the window 93 as a result of sliding displacement of the slide block 91. Thus, the color area 91B is visible from the window 93 to indicate the insertion of the card 100.

When the card 100 is withdrawn from the card retaining space 2, the slide block 91 is returned to its original position by the spring force of the coil spring 92. Thus, the color area 91B is retracted from the window 93, whereby the non-color area 91A is, instead, viewed from the outside.

The arrangement according to this embodiment also offers the same effects as in the fourth embodiment previously described.

Figure 23:
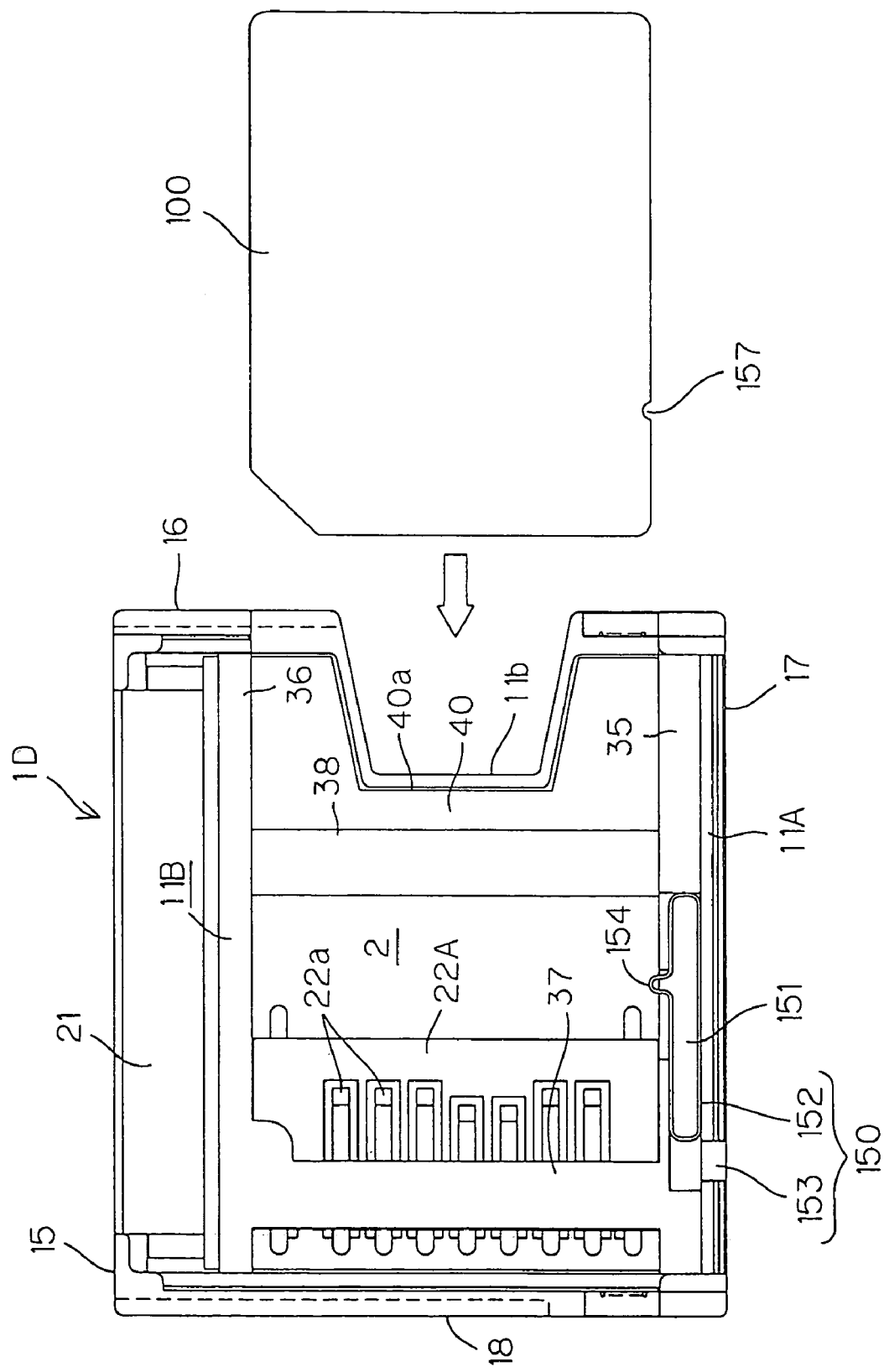
FIG. 23 is a plan view illustrating the internal construction of a card connection adaptor according to a seventh embodiment of the present invention.

FIG. 23 is a plan view illustrating the internal construction of a card connection adaptor according to a seventh embodiment of the present invention. In FIG. 23, like components corresponding to those shown in FIGS. 13 and 14 which illustrate the fourth embodiment are denoted by like reference characters.

A difference between the card connection adaptor 1D (hereinafter referred to simply as "adaptor 1D") according to the seventh embodiment and the adaptor 1A according to the fourth embodiment resides in the construction of the indication mechanism for providing an indication of the presence or absence of the card 100 in the adaptor on the rear face 17 of the housing 10 (frame 11).

More specifically, the indication mechanism 150 of the adaptor 1D of this embodiment includes a ring spring 152 fitted in a step portion 151 formed in the board press beam 35 of the press frame 11B, and a window 153 formed in the rear face 17 of the housing 10 (frame 11) on a downstream side of the step portion 151 with respect to the card insertion direction. The ring spring 152 is of a generally elliptical shape, and has an engagement projection 154 projecting into the card retaining space 2 from a linear portion thereof located adjacent the card retaining space 2.

As shown in FIG. 24, the ring spring 152 has a colored indication area 155 (indicated by hatch) provided adjacent a downstream end thereof with respect to the card insertion direction. The coloration of the indication area may be achieved in the same manner as for the slide portion 76 in the fourth embodiment previously described.

In this embodiment, an engagement recess 157 engageable to the engagement projection 154 is preliminarily provided in a side edge of the card 100. When the card 100 is inserted into the card retaining space 2, a corner on the front edge of the card 100 is brought into abutment against the engagement projection 154 to slidingly displace the ring spring 152 in the card insertion direction. Thus, the indication area 155 is located behind the window 153 thereby to be visible from the outside.

After the sliding displacement of the ring spring 152 is restricted by an end face of the step portion 151, the linear portion of the ring spring 152 adjacent to the card retaining space 2 is resiliently deformed to be pressed into the step portion 151. Upon completion of the insertion of the card 100, the engagement projection 154 engages with the engagement recess 157. This engagement is sustained by the spring force of the ring spring 152. In other words, a positional relationship between the engagement projection 154 of the ring spring 152 and the engagement recess 157 of the card 100 is determined so that this engagement state can be achieved.

When the card 100 is withdrawn from the card retaining space 2, the ring spring 152 is slid within the step portion 151 in accordance with the withdrawal of the card 100. The sliding displacement of the ring spring is restricted by an end face of the step portion 151 on an upstream side with respect to the card insertion direction. When the card 100 is further withdrawn in this state, the engagement projection 154 is disengaged from the engagement recess 157 mainly by the deformation of the ring spring 152, so that the card 100 can be removed from the card retaining space 2.

In accordance with this embodiment, the effect described in the fourth embodiment can be achieved with a simple construction.

Figure 25:
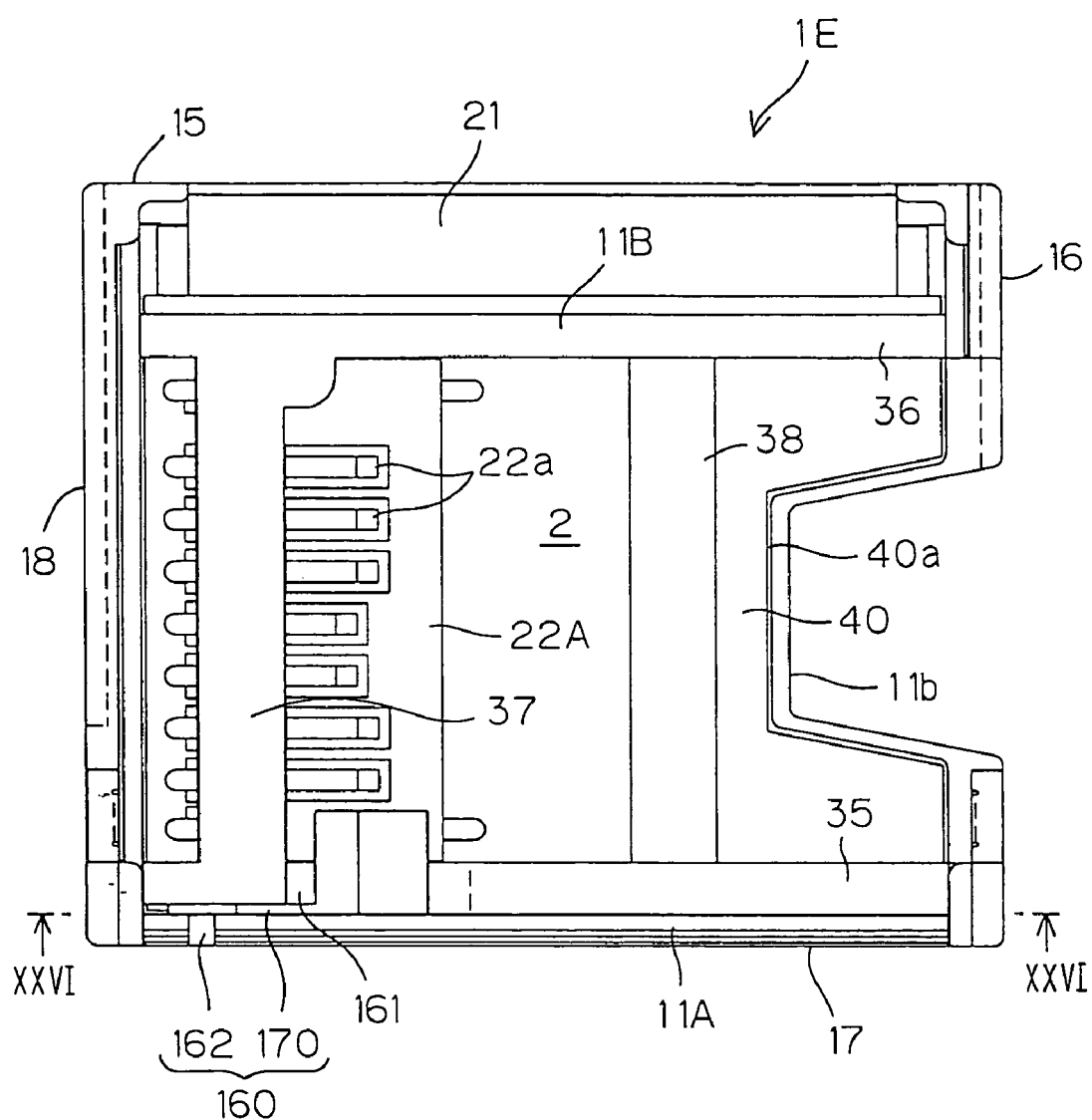
FIG. 25 is a plan view illustrating the internal construction of a card connection adaptor according to an eighth embodiment of the present invention.

FIG. 25 is a plan view illustrating the internal construction of a card connection adaptor according to an eighth embodiment of the present invention. FIGS. 26A and 26B are sectional views taken along a section line XXVI—XXVI in FIG. 25. Particularly, FIG. 26A illustrates a state where the card 100 is not retained in the card retaining space 2, and FIG. 26B illustrates a state where the card 100 is retained in the card retaining space 2. In FIGS. 25, 26A and 26B, like components corresponding to those shown in FIGS. 13 and 14 which illustrate the fourth embodiment are denoted by like reference characters.

A difference between the card connection adaptor 1E (hereinafter referred to simply as "adaptor 1E") according to the seventh embodiment and the adaptor 1A according to the fourth embodiment resides in the construction of the indication mechanism for providing an indication of the presence or absence of the card 100 in the adaptor on the rear face 17 of the housing 10 (frame 11).

More specifically, the indication mechanism 160 of the adaptor 1E of this embodiment includes a resilient depressible beam 170 provided in a step portion 161 formed in the board press beam 35 of the press frame 11B, and a window 162 formed in the rear face 17 of the housing 10 (frame 11). As shown in FIG. 27, the depressible beam 170 has a wider proximal portion as an operative portion 171, and a rectangular distal portion as an indicator portion 172 which vertically extends. One corner of the operative portion 171 is fixed to the board press beam 35 on an end face of the step portion 161 on an upstream side with respect to the card insertion direction. The operative portion 171 includes a tapered portion 171a which has a progressively increasing thickness toward a downstream side with respect to the card insertion direction, and projects into the card retaining space 2 adjacent the card connector 22A. A lower face of the depressible beam 170 is spaced apart from an upper face of the step portion 161, so that the depressible beam 170 can resiliently be deformed to be depressed. On the other hand, a surface of the indicator portion 172 opposed to the window 162 is colored. The coloration may be achieved in the same manner as for the slide portion 76 in the fourth embodiment previously described.

When the card 100 is inserted into the card retaining space 2, a corner on the front edge of the card 100 is brought into abutment against the tapered portion 171a of the depressible beam 170. When the card 100 is further forced into the card retaining space, the depressible beam 170 is downwardly deformed to be depressed by the card 100, which is in turn guided forward by the tapered portion 171a, thereby reaching a completely inserted state. At this time, the indicator portion 172 of the depressible beam 170 downwardly deformed is located behind the window 62 so as to be visible from the rear face 17 of the housing 10 (frame 11).

When the card 100 is withdrawn from the card retaining space 2, the depressible beam 170 is moved upward by its resilience thereby to be restored into its original state. At this time, the indicator portion 172 is displaced upward thereby to be retracted from the window 162. Therefore, the indicator portion 172 cannot be viewed from the rear face 17 of the housing 10 (frame 11).

This embodiment is also arranged so that the indicator portion 172 can be displaced between the position behind the window 162 and the position apart from the window 162 in response to the insertion and withdrawal of the card 100. Thus, an indication of the presence or absence of the card 100 in the adaptor 1E can be given by mechanical means.

Figure 28:
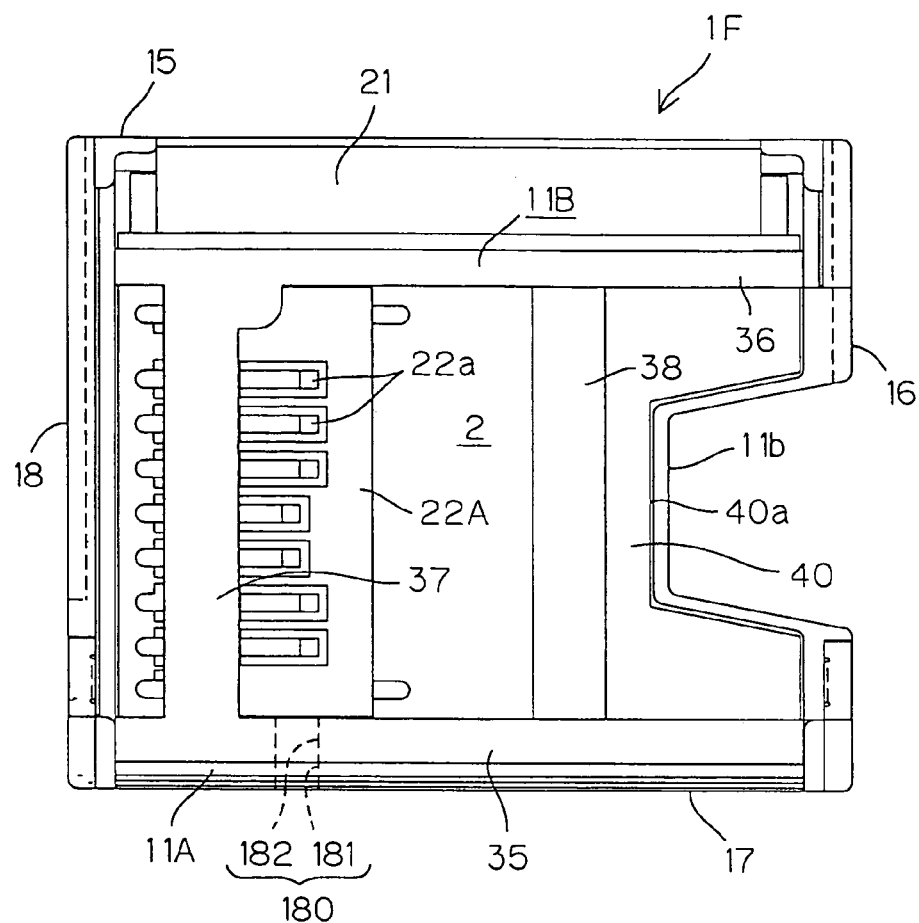
FIG. 28 is a plan view illustrating the internal construction of a card connection adaptor according to a ninth embodiment of the present invention.
Figure 29:
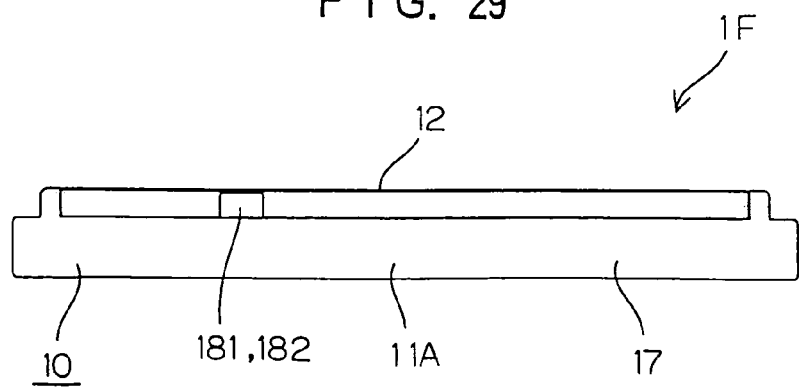
FIG. 29 is a front view of the adaptor as viewed from a rear face of a housing.

FIG. 28 is a plan view illustrating the internal construction of a card connection adaptor according to a ninth embodiment of the present invention. FIG. 29 is a front view of the adaptor as seen from the rear face of the housing 10 (frame 11). In FIGS. 28 and 29, like components corresponding to those shown in FIGS. 13 and 14 which illustrate the fourth embodiment are denoted by like reference characters.

A difference between the card connection adaptor 1F (hereinafter referred to simply as "adaptor 1F") according to the ninth embodiment and the card connection adaptor 1A according to the fourth embodiment resides in the construction of the indication mechanism for providing an indication of the presence or absence of the card 100 in the adaptor 1F on the rear face 17 of the housing 10 (frame 11).

More specifically, the indication mechanism 180 of this embodiment includes a window 181 formed in the rear face 17 of the frame body 11A, and a window 182 (which may be a through-hole or an upwardly opening step portion) formed in the press frame 11B in such a position that the window 182 can be aligned with the window 181. The windows 181, 182 are located behind a side wall of the card retaining space 2 (which extends in the card insertion direction parallel to the rear face 17) adjacent the card connector 22A.

Further, the entire rear face 17 is imparted with a color distinguishable from the card 100. The coloration may be achieved in the same manner as for the slide portion 76 in the fourth embodiment previously described.

When the card 100 is fitted in the card retaining space 2, a portion of the side face of the card 100 adjacent to the front edge thereof is located behind the windows 181, 182, so that the card 100 can be viewed from the outside of the housing 10. When the card 100 is removed from the card retaining space 2, the card 100 is not seen from the windows 181, 182. Since the rear face 17 is colored, the presence or absence of the card 100 in the card retaining space 2 can effectively be checked for. Thus, the presence or absence of the card 100 in the adaptor 1F can visually be perceived from the outside of the housing 10.

Table 1 shows possible combinations of a standard to be employed as the first standard for the card slot and a standard to be employed as the second standard for the card. In Table 1, the present invention is applicable to combinations of standards indicated by "o" and is in applicable, in principle, to combinations of standards indicated by "x".

It is noted that the combinations of standards indicated by "x" include those to which the invention will be applicable if a design modification of the card slot such as widening of the card insertion port of the card slot is made as required by market demands.

| | | Card | | | | | | | | | | | |
|---|---|---|---|---|---|---|---|---|---|---|---|---|---|
| | | PC | | | SPC | | | CF | | | | | |
| Card slot | | I | II | III | I | II | III | I | II | SM | MMC | MS | MC | SIM |
| PC | I | \ | x | x | o | x | x | o | x | o | o | o | x | o |
| | II | x | \ | x | o | o | x | o | o | o | o | o | o | o |
| | III | x | x | \ | o | o | o | o | o | o | o | o | o | o |
| SPC | I | x | x | x | \ | x | x | x | x | x | o | x | x | o |
| | II | x | x | x | x | \ | x | x | x | x | o | x | o | o |
| | III | x | x | x | x | x | \ | x | x | x | o | x | o | o |
| CF | I | x | x | x | x | x | x | \ | x | x | o | x | x | o |
| | II | x | x | x | x | x | x | x | \ | x | o | x | o | o |

If the frame 11 itself has a color distinguishable from the color of the card 100, the coloration of the rear face 17 is not necessarily required. It is not necessary to color the entire rear face 17, but only the periphery of the window 181 may be colored. Further, it is also possible that the frame 11 be not colored but, instead, a surface area of the card 100 which can be seen from the windows 181, 182 be colored.

While the present invention has thus been described by way of the several embodiments, it is noted that the invention can be embodied in any other ways. For example, the first embodiment may be modified, as shown in FIG. 30, so that a pair of terminals 191, 192 are provided in the card connector 22 to be brought into common contact with one of the terminals 111 of the card 100 that is supplied with a source voltage. One 191 of the terminals is arranged to be supplied with the source voltage from the information system 300 and the other terminal 192 is connected to the light emitting diode 27. With this arrangement, when the card 100 is fitted in the card retaining space 2, continuity is established between the terminals 191 and 192 via the terminal 111. Therefore, when the adaptor 1 is fitted in the CF card slot 301, the light emitting diode 27 is powered, so that the insertion of the card 100 can be indicated by illumination of the light emitting diode 27. If the card 100 is not inserted, continuity is not established between the terminals 191 and 192. Therefore, the light emitting diode 27 is not lit even if the adaptor 1 is inserted in the CF card slot 301.

Although the card connection adaptors explained in the first to ninth embodiments are designed to adapt a Multi-Media card to a CF card slot, the invention is also applicable to conversion between any other different standards. If the card inserted into the adaptor projects rearwardly of the adaptor with respect to the card inserting direction, however, it is impossible to fit the adaptor in the card slot of a normal construction. Therefore, physical limitations may be imposed on combinations of the card standards for use with ordinary card slots.

While the present invention has been described in detail by way of the embodiments thereof, it should be understood that the foregoing disclosure is merely illustrative of the technical principles of the present invention but not limitative of the same. The spirit and scope of the present invention are to be limited only by the appended claims.

This application claims priority benefits under 35 USC Section 119 on the basis of Japanese Patent Application No. 11-13333 filed to the Japanese Patent Office on Jan. 22, 1999, the disclosure thereof being incorporated herein by reference.

What is claimed is:

1. A card connection adaptor for connecting, to a connector of a card slot disposed in a card slot connector housing compliant with a predetermined first standard, a card compliant with a second standard which is different from the first standard, the card connection adaptor comprising:

a first connector compliant with the first standard and adapted to be electrically connected to the connector of the card slot;

a second connector compliant with the second standard;

signal conversion circuitry connected to the first connector and the second connector for performing signal conversion between a first-standard-compliant signal and a second-standard-compliant signal; and a housing which holds the first connector, the second connector and the signal conversion circuitry, the housing having a card insertion port which opens generally perpendicularly to an adaptor insertion direction in which the card connection adaptor is inserted into the card slot of the card slot connector housing, and a card retaining space for retaining therein the second-standard-compliant card inserted from the card insertion port, wherein, when the card connection adaptor with the second-standard-compliant card retained in the card retaining space is inserted into the card slot of the card slot connector housing, the second-standard-compliant card is at least contained within both the card slot connector housing and the card connector adapter in a manner to prevent inadvertent disconnection of the second-standard-compliant card from the card connector adapter while inserted in the card slot.

2. A card connection adaptor as set forth in claim 1, wherein
the first standard is a standard which stipulates that an input/output control circuit be provided in a card to be fitted into the card slot.

3. A card connection adaptor as set forth in claim 2, wherein
the signal conversion circuitry includes the input/output control circuit for controlling input and output of the second-standard-compliant card.

4. A card connection adaptor as set forth in claim 2, wherein
the second standard is a standard which stipulates that an input/output control circuit be provided in the second-standard-compliant card.

5. A card connection adaptor as set forth in claim 1, wherein
the card connection adaptor has a card shape conformal to the first-standard-compliant card slot.

6. A card connection adaptor as set forth in claim 1, wherein
the card retaining space is closed on its rear side as seen in the adaptor insertion direction so that the second-standard-compliant card cannot be inserted or withdrawn from the rear side of the card retaining space.

7. A card connection adaptor as set forth in claim 1, wherein
the first connector is adapted to be contact-connected to the connector of the card slot.

8. A card connection adaptor as set forth in claim 1, wherein
the card connection adaptor is adapted to be powered through the connector of the card slot and the first connector.

9. A card connection adaptor as set forth in claim 1, wherein
the second connector is capable of powering there through the second-standard-compliant card fitted in the card connection adaptor.

10. A card connection adaptor as set forth in claim 1, wherein the card slot is a PC-standard memory card slot.

11. A card connection adaptor as set forth in claim 1, wherein
the card retaining space is configured so as not to allow the second-standard-compliant card to project outwardly of the card retaining space when the card is retained in the card retaining space.

12. A card connection adaptor as set forth in claim 1, further comprising
a wiring board provided within the housing, on which the first connector, the second connector and the signal conversion circuitry are mounted.

13. A card connection adaptor as set forth in claim 1, wherein
the signal conversion circuitry includes a pin configuration conversion circuit for converting a pin configuration between a first-standard-compliant card and a second-standard-compliant card.

14. A card connection adaptor as set forth in claim 1, wherein
the signal conversion circuitry includes a signal processing circuit for converting signal format between the first-standard-compliant signal and the second-standard-compliant signal to ensure inter-standard compatibility.

15. A card connection adaptor as set forth in claim 1, wherein
the second-standard-compliant card is a memory card which incorporates therein a memory IC and has a data storage function.

* * * * *